(12) United States Patent
Silverman et al.

(10) Patent No.: US 9,707,532 B1
(45) Date of Patent: Jul. 18, 2017

(54) HTL REACTOR GEOMETRY

(71) Applicant: Ivanhoe HTL Petroleum Ltd., Houston, TX (US)

(72) Inventors: Michael Silverman, Houston, TX (US); Steve Kalota, Irvine, CA (US)

(73) Assignee: IVANHOE HTL PETROLEUM LTD., Houston, TX (US)

( * ) Notice: Subject to any disclaimer, the term of this patent is extended or adjusted under 35 U.S.C. 154(b) by 0 days.

(21) Appl. No.: 14/197,088

(22) Filed: Mar. 4, 2014

Related U.S. Application Data

(60) Provisional application No. 61/772,153, filed on Mar. 4, 2013, provisional application No. 61/772,168, filed on Mar. 4, 2013.

(51) Int. Cl.
- B01J 8/24 (2006.01)
- C10G 11/00 (2006.01)
- B01J 6/00 (2006.01)

(52) U.S. Cl.
CPC ............. B01J 6/008 (2013.01); B01J 8/24 (2013.01); C10G 11/00 (2013.01)

(58) Field of Classification Search
CPC .................................. B01J 8/24; C10G 11/00
USPC ........................................................ 422/214
See application file for complete search history.

(56) References Cited

U.S. PATENT DOCUMENTS

| | | | |
|---|---|---|---|
| 2,573,906 A | 11/1951 | Huff | |
| 2,735,804 A | 2/1956 | Boston et al. | |
| 3,039,955 A | 6/1962 | Honnold | |
| 3,353,925 A * | 11/1967 | Baumann et al. | 422/214 |
| 3,375,175 A | 3/1968 | Ralph et al. | |
| 3,472,758 A | 10/1969 | Stine et al. | |
| 3,544,448 A | 12/1970 | Jacobs et al. | |
| 3,582,276 A | 6/1971 | Campbell et al. | |
| 3,607,171 A | 9/1971 | Hirsch | |
| 3,850,739 A | 11/1974 | Wunderlich et al. | |
| 3,853,498 A | 12/1974 | Bailie | |
| 3,915,844 A | 10/1975 | Ueda et al. | |
| 3,929,619 A | 12/1975 | Sinfelt et al. | |
| 4,039,390 A | 8/1977 | Logan | |
| 4,054,492 A | 10/1977 | Rammler et al. | |
| 4,057,490 A | 11/1977 | Wynne, Jr. | |
| 4,064,018 A | 12/1977 | Choi | |

(Continued)

FOREIGN PATENT DOCUMENTS

| | | |
|---|---|---|
| CA | 932686 A1 | 8/1973 |
| CA | 1050736 A1 | 3/1979 |

(Continued)

OTHER PUBLICATIONS

EP Search Report, Appln. No. 03 25 6393.

(Continued)

Primary Examiner — Walter D Griffin
Assistant Examiner — Huy-Tram Nguyen
(74) Attorney, Agent, or Firm — Orrick, Herrington & Sutcliffe LLP

(57) ABSTRACT

The present disclosure is directed to the upgrading of heavy hydrocarbon feedstock. The systems of the present disclosure provides for improved reactor geometries to create more efficient processing and upgrading of the feedstocks. The reactor geometry may be varied by the addition of periodic bumps on the reactor walls and/or by the tapering of the diameter of the upflow reactor.

7 Claims, 11 Drawing Sheets

(56) References Cited

U.S. PATENT DOCUMENTS

| | | |
|---|---|---|
| 4,080,285 A | 3/1978 | McKinney et al. |
| 4,083,751 A | 4/1978 | Choi et al. |
| 4,085,030 A | 4/1978 | Green et al. |
| 4,087,347 A | 5/1978 | Langlois et al. |
| 4,097,362 A | 6/1978 | McKinney et al. |
| 4,102,773 A | 7/1978 | Green et al. |
| 4,106,999 A | 8/1978 | Koppelman et al. |
| 4,108,732 A | 8/1978 | Nuttall, Jr. |
| 4,141,794 A | 2/1979 | Choi |
| 4,147,593 A | 4/1979 | Frischmuth et al. |
| 4,153,514 A | 5/1979 | Garrett et al. |
| 4,161,442 A | 7/1979 | Audeh et al. |
| 4,166,786 A | 9/1979 | Duralswamy et al. |
| 4,186,079 A | 1/1980 | Roberts |
| 4,211,606 A | 7/1980 | Ponomarev et al. |
| 4,232,514 A | 11/1980 | Flatt |
| 4,243,514 A | 1/1981 | Bartholic |
| 4,252,634 A | 2/1981 | Khulbe et al. |
| 4,260,456 A | 4/1981 | Schulman |
| 4,263,128 A | 4/1981 | Bartholic |
| 4,280,876 A | 7/1981 | Green |
| 4,294,686 A | 10/1981 | Fisher et al. |
| 4,298,453 A | 11/1981 | Schoennagel et al. |
| 4,305,809 A | 12/1981 | Chen et al. |
| 4,311,580 A | 1/1982 | Bartholic |
| 4,322,222 A | 3/1982 | Sass |
| 4,325,817 A | 4/1982 | Bartholic et al. |
| 4,328,091 A | 5/1982 | Bartholic |
| 4,375,402 A | 3/1983 | Durai-Swamy |
| 4,409,416 A | 10/1983 | Snell et al. |
| 4,427,538 A | 1/1984 | Bartholic |
| 4,427,539 A | 1/1984 | Busch et al. |
| 4,428,862 A | 1/1984 | Ward et al. |
| 4,435,272 A | 3/1984 | Bartholic et al. |
| 4,490,234 A | 12/1984 | Buzza |
| 4,490,243 A | 12/1984 | Miyauchi et al. |
| 4,507,195 A | 3/1985 | Spars et al. |
| 4,569,753 A | 2/1986 | Busch et al. |
| 4,578,183 A | 3/1986 | Chou et al. |
| 4,604,268 A | 8/1986 | Kay et al. |
| 4,617,107 A | 10/1986 | Mandelson et al. |
| 4,661,240 A | 4/1987 | Kessick et al. |
| 4,668,378 A | 5/1987 | Miyauchi et al. |
| 4,693,808 A | 9/1987 | Dewitz |
| 4,747,938 A | 5/1988 | Khan |
| 4,772,378 A | 9/1988 | Miyauchi et al. |
| 4,814,067 A | 3/1989 | Gartside et al. |
| 4,816,136 A | 3/1989 | Allan et al. |
| 4,818,373 A | 4/1989 | Bartholic et al. |
| 4,828,681 A | 5/1989 | Yourtee et al. |
| 4,861,458 A | 8/1989 | Martin et al. |
| 4,919,898 A | 4/1990 | Gartside et al. |
| 4,980,045 A | 12/1990 | Krishna et al. |
| 4,985,136 A | 1/1991 | Bartholic |
| 5,024,750 A | 6/1991 | Sughrue et al. |
| 5,073,666 A | 12/1991 | Zemanian et al. |
| 5,077,261 A | 12/1991 | Schubert |
| 5,092,984 A | 3/1992 | Babu et al. |
| 5,102,854 A | 4/1992 | Delzer et al. |
| 5,120,428 A | 6/1992 | Ikura et al. |
| 5,136,117 A | 8/1992 | Paisley et al. |
| 5,264,623 A | 11/1993 | Oehr et al. |
| 5,275,720 A | 1/1994 | Ward |
| 5,296,131 A | 3/1994 | Raterman |
| 5,310,717 A | 5/1994 | Delzer et al. |
| 5,326,919 A | 7/1994 | Paisley et al. |
| 5,338,322 A | 8/1994 | Ignasiak et al. |
| 5,370,789 A | 12/1994 | Milne et al. |
| 5,413,702 A | 5/1995 | Yan |
| 5,538,625 A | 7/1996 | Sigaud et al. |
| 5,626,741 A | 5/1997 | Mosby et al. |
| 5,626,742 A | 5/1997 | Brons et al. |
| 5,662,868 A | 9/1997 | Letzsch et al. |
| 5,723,040 A | 3/1998 | Letzsch et al. |
| 5,733,438 A | 3/1998 | Tong et al. |
| 5,792,340 A | 8/1998 | Freel et al. |
| 5,807,478 A | 9/1998 | Myers et al. |
| 5,820,750 A | 10/1998 | Blum et al. |
| 5,851,380 A * | 12/1998 | Wells .............................. 208/158 |
| 5,858,213 A | 1/1999 | Chomyn |
| 5,904,839 A | 5/1999 | Brons |
| 5,928,501 A | 7/1999 | Sudhakar et al. |
| 5,961,786 A | 10/1999 | Freel et al. |
| 6,123,832 A | 9/2000 | Ho et al. |
| 6,511,635 B2 * | 1/2003 | Mauleon .............. B01F 5/0451 208/113 |
| 6,596,242 B1 * | 7/2003 | Dries ............................ 422/139 |
| 6,652,815 B1 * | 11/2003 | Sattar ........................... 422/145 |
| 6,814,940 B1 | 11/2004 | Hiltunen et al. |
| 6,924,402 B2 | 8/2005 | Moon et al. |
| 7,270,743 B2 | 9/2007 | Freel et al. |
| 7,572,362 B2 | 8/2009 | Freel et al. |
| 7,658,889 B2 * | 2/2010 | Roux ..................... B01J 8/0025 422/145 |
| 8,062,503 B2 | 11/2011 | Freel et al. |
| 8,105,482 B1 | 1/2012 | Freel et al. |
| 9,005,428 B2 | 4/2015 | Freel et al. |
| 2002/0100711 A1 | 8/2002 | Freel et al. |
| 2004/0069686 A1 | 4/2004 | Freel et al. |
| 2007/0066860 A1 | 3/2007 | Buchanan et al. |
| 2008/0035526 A1 * | 2/2008 | Hedrick et al. ............... 208/113 |
| 2012/0125815 A1 | 5/2012 | Freel et al. |
| 2012/0279825 A1 | 11/2012 | Freel et al. |

FOREIGN PATENT DOCUMENTS

| | | |
|---|---|---|
| CA | 1090732 A1 | 12/1980 |
| CA | 1108545 A1 | 9/1981 |
| CA | 1283880 C | 5/1991 |
| DE | 38 28 633 A1 | 3/1989 |
| EP | 0072873 B1 | 2/1986 |
| EP | 0513051 B1 | 12/1994 |
| EP | 1049038 A2 | 11/2000 |
| GB | 2117394 A | 10/1983 |
| WO | WO 91/11499 A1 | 8/1991 |
| WO | WO 97/31083 A1 | 8/1997 |
| WO | WO 00/61705 A1 | 10/2000 |
| WO | WO 02/33029 A1 | 4/2002 |

OTHER PUBLICATIONS

EP Examination Report, Appln. No. 10075528.9.

Berg et al., "Characterization of Solids Mixing in an Ultra-Rapid Fluidized Reactor," Power and Bulk Solids Conference, 1986.

Berg et al., "Rapid Mixing Studies Between Transported Solids in an Ultra-Rapid Fluidized Reactor," Power and Bulk Solids Conference, 1985.

Bliss et al., "Silivicultural Biomass Farms, vol. V, Conversion Processes and Costs," MITRE Technical Report No. 7347, vol. 5, pp. 68, May 1977.

Dinovo et al., "Preliminary Assessment of Biomass Conversion to Synthetic Fuels," Industrial Environmental Research Laboratory, pp. 123, 125-127, Oct. 1978.

Fritz et al., "Status Review of Wood Biomass: Gasification, Pyrolysis, and Densification Technologies," pp. 66-67, Jan. 1979.

Gavalas, "Coal Pyrolysis," Coal Science and Technology 4, pp. 70-76, 1982.

Levelton et al., "An Evaluation of Wood Waste Energy Conversion Systems," Enfor Project No. C-111, pp. 5-62, Dec. 1980.

Oberg et al., "Coal Liquefaction by Flash Hydropyrloysis," Coal Processing Technology 6, pp. 159-165, 1980.

Preston, "Resource Recovery and Flash Pyrolysis of Municipal Refuse," Institute of Gas Technology Symposium, pp. 1-28, Jan. 1976.

Serper, "Resource Recovery Field Stands Poised Between Problems, Solutions," Solid Wastes Management Journal, pp. 16, 86, May 1980.

Sorbo et al., "Technical and Economic Feasibility of Small Scale Co-Gasification of Densified Sludge and Solid Waste," Symposium Papers Excerpt, Energy from Biomass and Wastes VI, pp. 587, 596, 628, Jan. 1982.

(56) References Cited

OTHER PUBLICATIONS

Symposium Papers Excerpt, "Energy from Biomass and Wastes IV," pp. 1, 25, Jan. 1980.
Symposium Papers Excerpt, "Energy from Biomass and Wastes V," pp. 1, 41, Jan. 1981.
Symposium Papers Excerpt, "Energy from Biomass and Wastes V," pp. 587,596,628, Jan. 1982.
Textbook Excerpts, "Occidental Flash Pyrolysis," pp. 285-286; "Rockwell Flash Pyrolysis," pp. 285-287. (No dates).

* cited by examiner

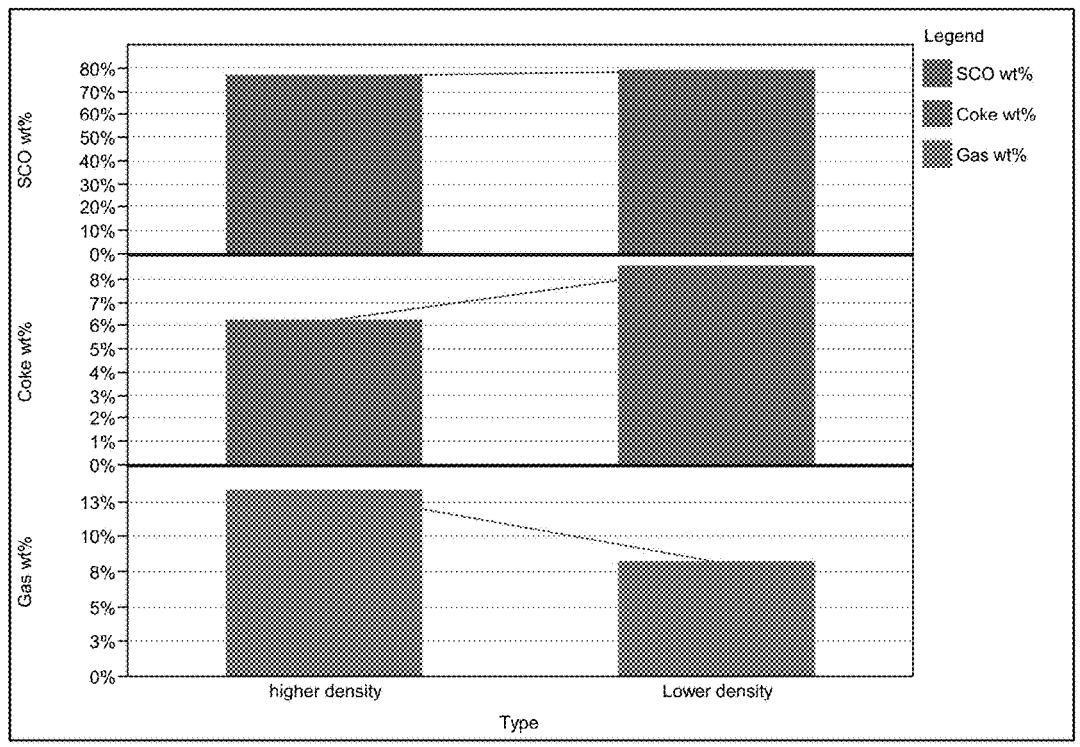
Figure 8. BETE nozzle comparison of high density and low density reactor feed zone.
BETE nozzle, avg of 2 runs
| Type | SCO wt% | Coke wt% | Gas wt% | Mtl Bal | API |
|---|---|---|---|---|---|
| higher density | 77% | 6% | 13% | 96% | 13.8 |
| Lower density | 79% | 9% | 8% | 96% | 13.35 |

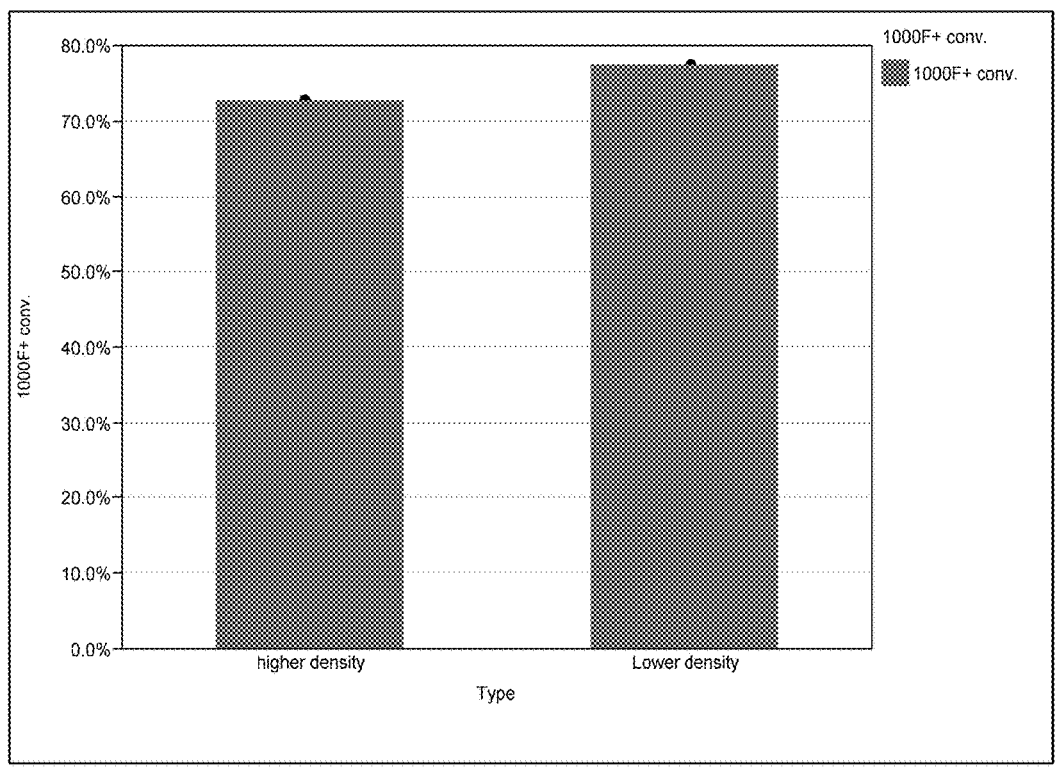
Figure 9. BETE nozzle 1000F+ conversion with high and low density feed zone.

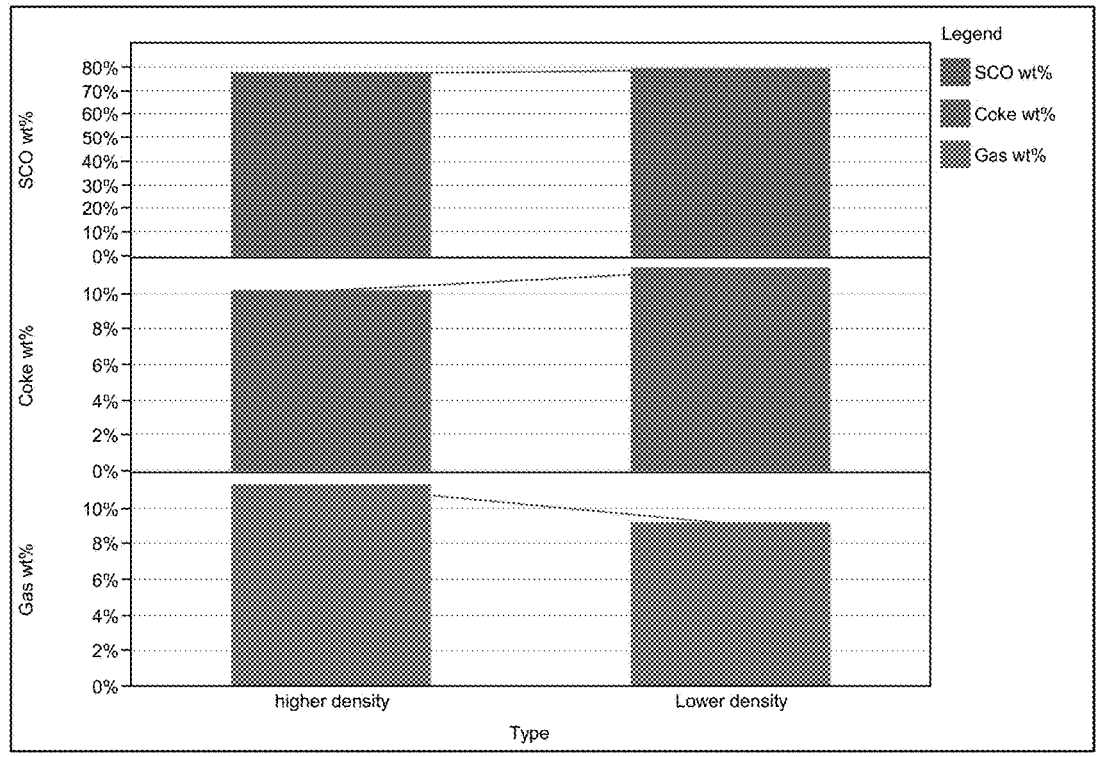
Figure 10. Clover nozzle comparison of high density and low density reactor feed zone.
Clover Nozzle, avg of 2 runs
| Type | SCO wt% | Coke wt% | Gas wt% | Mtl Bal | API |
|---|---|---|---|---|---|
| higher density | 77.30% | 10.21% | 11.29% | 98.80% | 13.4 |
| Lower density | 79.03% | 11.38% | 9.16% | 99.57% | 13.4 |

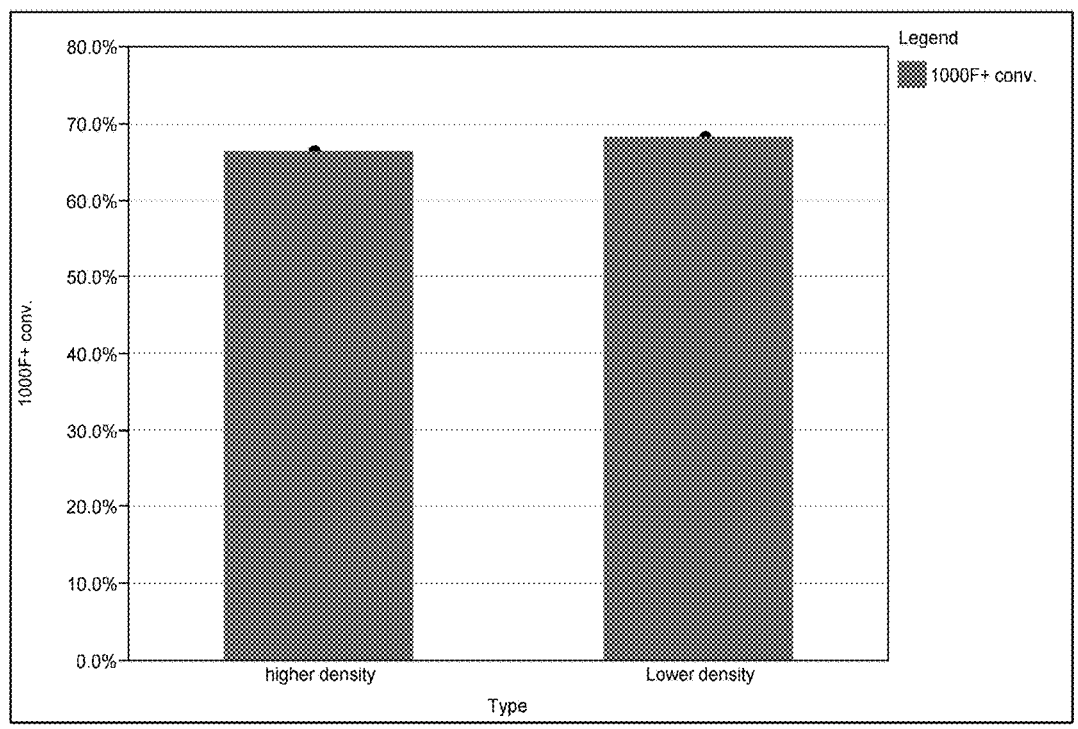
Figure 11. Clover nozzle 1000F+ conversion with high and low density feed zone.

HTL REACTOR GEOMETRY

CROSS-REFERENCE TO RELATED APPLICATIONS

This application claims priority to U.S. Provisional Application Ser. Nos. 61/772,153 and 61/772,168, both filed Mar. 4, 2013, and each incorporated herein by reference in their entireties.

FIELD

The present disclosure relates to the rapid thermal processing of viscous oil feedstocks. More specifically, this disclosure relates to the use of pyrolysis in order to upgrade and reduce the viscosity of these oils and systems for the processing.

BACKGROUND

Heavy oil and bitumen resources are supplementing the decline in the production of conventional light and medium crude oil, and production form these resources is expected to dramatically increase. Pipeline expansion is expected to handle the increase in heavy oil production, however, the heavy oil must be treated in order to permit its transport by pipeline. Presently heavy oil and bitumen crudes are either made transportable by the addition of diluents or they are upgraded to synthetic crude. However, diluted crudes or upgraded synthetic crudes are significantly different from conventional crude oils. As a result, bitumen blends or synthetic crudes are not easily processed in conventional fluid catalytic cracking refineries. Therefore, in either case the refiner must be configured to handle either diluted or upgraded feedstocks.

Many heavy hydrocarbon feedstocks are also characterized as comprising significant amounts of BS&W (bottom sediment and water). Such feedstocks are not suitable for transportable by pipeline, or upgrading due to the sand, water and corrosive properties of the feedstock. Typically, feedstocks characterized as having less than 0.5 wt. % BS&W are transportable by pipeline, and those comprising greater amount of BS&W require some degree of processing and treatment to reduce the BS&W content prior to transport. Such processing may include storage to let the water and particulates settle, followed by heat treatment to drive of water and other components. However, these manipulations are expensive and time consuming. There is therefore a need within the art for an efficient method for upgrading feedstock comprising a significant BS&W content prior to transport or further processing of the feedstock.

Heavy oils and bitumens can be upgraded using a range of rapid processes including thermal (e.g. U.S. Pat. No. 4,490,234; U.S. Pat. No. 4,294,686; U.S. Pat. No. 4,161,442), hydrocracking (U.S. Pat. No. 4,252,634) visbreaking (U.S. Pat. No. 4,427,539; U.S. Pat. No. 4,569,753; U.S. Pat. No. 5,413,702) or catalytic cracking (U.S. Pat. No. 5,723,040; U.S. Pat. No. 5,662,868; U.S. Pat. No. 5,296,131; U.S. Pat. No. 4,985,136; U.S. Pat. No. 4,772,378; U.S. Pat. No. 4,668,378, U.S. Pat. No. 4,578,183) procedures. Several of these processes, such as visbreaking or catalytic cracking, utilize either inert or catalytic particulate contact materials within upflow or downflow reactors. Catalytic contact materials are for the most part zeolite based (see for example U.S. Pat. No. 5,723,040; U.S. Pat. No. 5,662,868; U.S. Pat. No. 5,296,131; U.S. Pat. No. 4,985,136; U.S. Pat. No. 4,772,378; U.S. Pat. No. 4,668,378, U.S. Pat. No. 4,578,183; U.S. Pat. No. 4,435,272; U.S. Pat. No. 4,263,128), while visbreaking typically utilizes inert contact material (e.g. U.S. Pat. No. 4,427,539; U.S. Pat. No. 4,569,753), carbonaceous solids (e.g. U.S. Pat. No. 5,413,702), or inert kaolin solids (e.g. U.S. Pat. No. 4,569,753).

The use of fluid catalytic cracking (FCC), or other, units for the direct processing of bitumen feedstocks is known in the art. However, many compounds present within the crude feedstocks interfere with these process by depositing on the contact material itself. These feedstock contaminants include metals such as vanadium and nickel, coke precursors such as Conradson carbon and asphaltenes, and sulfur, and the deposit of these materials results in the requirement for extensive regeneration of the contact material. This is especially true for contact material employed with FCC processes as efficient cracking and proper temperature control of the process requires contact materials comprising little or no combustible deposit materials or metals that interfere with the catalytic process.

To reduce contamination of the catalytic material within catalytic cracking units, pretreatment of the feedstock via visbreaking (U.S. Pat. No. 5,413,702; U.S. Pat. No. 4,569,753; U.S. Pat. No. 4,427,539), thermal (U.S. Pat. No. 4,252,634; U.S. Pat. No. 4,161,442) or other processes, typically using FCC-like reactors, operating at temperatures below that required for cracking the feedstock (e.g. U.S. Pat. No. 4,980,045; U.S. Pat. No. 4,818,373 and U.S. Pat. No. 4,263,128) have been suggested. These systems operate in series with FCC units and function as pre-treaters for FCC. These pretreatment processes are designed to remove contaminant materials from the feedstock, and operate under conditions that mitigate any cracking. This ensures that any upgrading and controlled cracking of the feedstock takes place within the FCC reactor under optimal conditions.

Several of these processes (e.g. U.S. Pat. No. 4,818,373; U.S. Pat. No. 4,427,539; U.S. Pat. No. 4,311,580; U.S. Pat. No. 4,232,514; U.S. Pat. No. 4,263,128) have been specifically adapted to process "resids" (i.e. feedstocks produced from the fractional distillation of a whole crude oil) and bottom fractions, in order to optimize recovery from the initial feedstock supply. The disclosed processes for the recovery of resids, or bottom fractions, are physical and involve selective vaporization or fractional distillation of the feedstock with minimal or no chemical change of the feedstock. These processes are also combined with metals removal and provide feedstocks suitable for FCC processing. The selective vaporization of the resid takes place under non-cracking conditions, without any reduction in the viscosity of the feedstock components, and ensures that cracking occurs within an FCC reactor under controlled conditions. None of these approaches disclose the upgrading of feedstock within this pretreatment (i.e. metals and coke removal) process. Other processes for the thermal treatment of feedstocks involve hydrogen addition (hydrotreating) which results in some chemical change in the feedstock.

U.S. Pat. No. 4,294,686 discloses a steam distillation process in the presence of hydrogen for the pretreatment of feedstock for FCC processing. This document also indicates that this process may also be used to reduce the viscosity of the feedstock such that the feedstock may be suitable for transport within a pipeline. However, the use of short residence time reactors to produce a transportable feedstock is not disclosed.

There is a need within the art for a rapid and effective upgrading process of a heavy oil or bitumen feedstock that involves a partial chemical upgrade or mild cracking of the feedstock in order to obtain a product characterized in having a reduced viscosity over the starting material. Ideally this process would be able to accommodate feedstocks comprising significant amounts of BS&W. This product would be transportable for further processing and upgrading. Such a process would not involve any catalytic-cracking activity due to the known contamination of catalyst contact materials with components present in heavy oil or bitumen feedstocks. The rapid and effective upgrading process would produce a product characterized in having reduced viscosity, reduced metal content, increased API, and an optimal product yield.

The present disclosure is directed to the upgrading of heavy hydrocarbon feedstocks, for example but not limited to heavy oil or bitumen feedstocks, that utilizes a short residence pyrolytic reactor operating under conditions that cracks and chemically upgrades the feedstock. The feedstock used within this process may comprise significant levels of BS&W and still be effectively processed, thereby increasing the efficiency of feedstock handling. The process of the present disclosure provides for the preparation of a partially upgraded feedstock exhibiting reduced viscosity and increased API gravity. The process described herein selectively removes metals, salts, water and nitrogen from the feedstock, while at the same time maximizes the liquid yield, and minimizing coke and gas production. Furthermore, this process reduces the viscosity of the feedstock to an extent which can permit pipeline transport of the feedstock without addition of diluents. The partially upgraded product optionally permits transport of the feedstock offsite, to locations better equipped to handle refining. Such facilities are typically located at a distance from the point where the crude feedstock is obtained.

BRIEF DESCRIPTION OF THE DRAWINGS

These and other features of the disclosure will become more apparent from the following description in which reference is made to the appended drawings wherein:

FIGS. 8-11 are test results from exemplary test runs using the teachings of the present disclosure.

DESCRIPTION OF THE PREFERRED EMBODIMENTS

Figure 1:
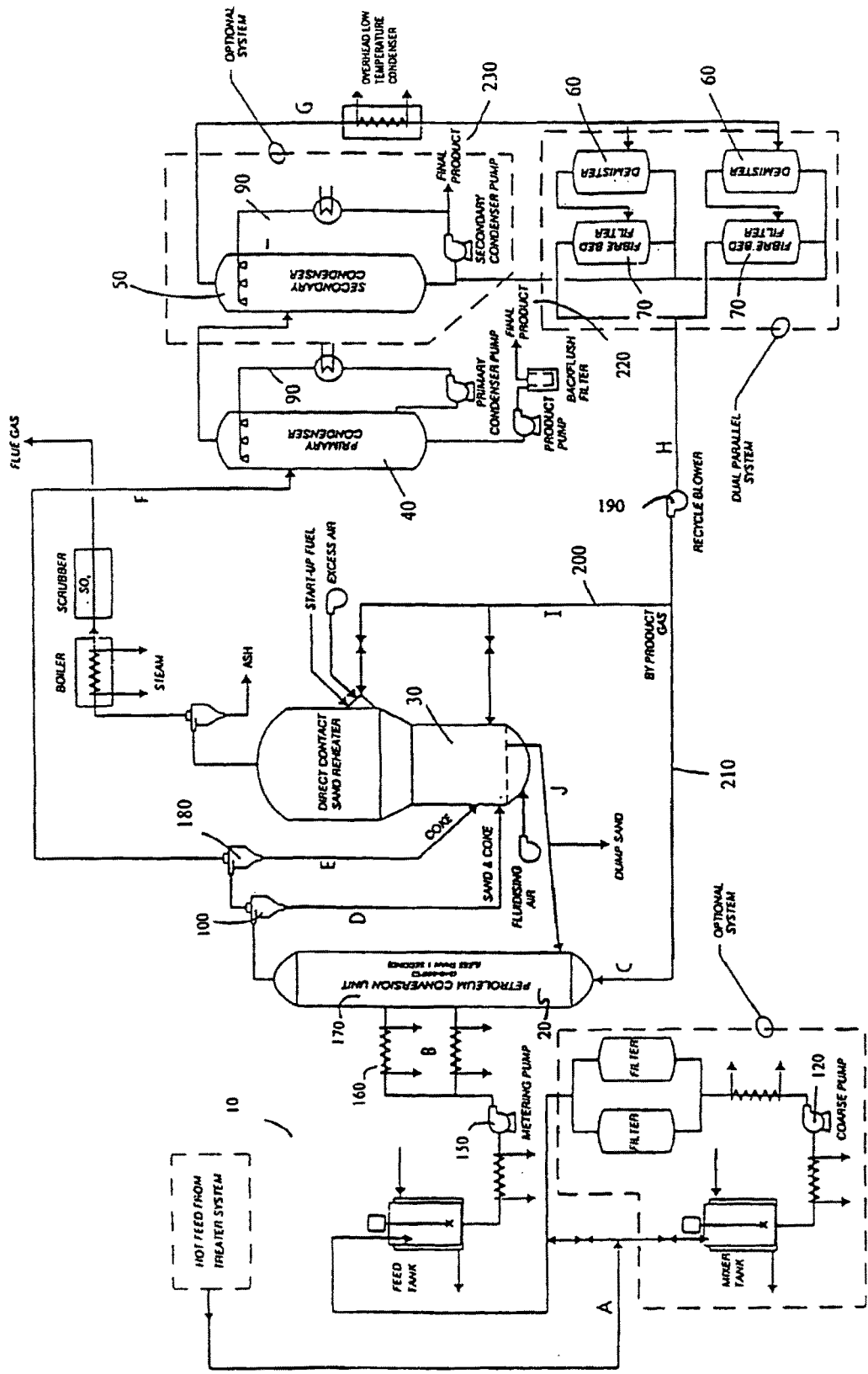
FIG. 1 is a schematic drawing of an embodiment of the present disclosure relating to a system for the pyrolytic processing of feedstocks.

The present disclosure relates to the rapid thermal processing of viscous crude oil feedstocks. More specifically, this disclosure relates to the use of pyrolysis in order to upgrade and reduce the viscosity of these oils.

The following description is of a preferred embodiment by way of example only and without limitation to the combination of features necessary for carrying the disclosure into effect.

By "feedstock" it is generally meant a heavy hydrocarbon feedstock comprising, but not limited to, heavy oil or bitumens. However, the term "feedstock" may also include other hydrocarbon compounds such as petroleum crude oil, atmospheric tar bottom products, vacuum tar bottoms, coal oils, residual oils, tar sands, shale oil and asphaltic fractions. Furthermore, the feedstock may comprise significant amounts of BS&W (Bottom Sediment and Water), for example, but not limited to, a BS&W content of greater than 0.5% (wt %). Feedstock may also include pre-treated (pre-processed) feedstocks as defined below, however, heavy oil and bitumen are the preferred feedstock. These heavy oil and bitumen feedstocks are typically viscous and difficult to transport. Bitumens typically comprise a large proportion of complex polynuclear hydrocarbons (asphaltenes) that add to the viscosity of this feedstock and some form of pretreatment of this feedstock is required for transport. Such pretreatment typically includes dilution in solvents prior to transport.

Typically tar-sand derived feedstocks (see Example 1 for an analysis of examples, which are not to be considered limiting, of such feedstocks) are pre-processed prior to upgrading, as described herein, in order to concentrate bitumen. However, pre-processing may also involve methods known within the art, including hot or cold water treatments, or solvent extraction that produces a bitumen-gas oil solution. These pre-processing treatments typically reduce the sand content of bitumen.

For example one such water pre-processing treatment involves the formation of a tar-sand containing bitumen-hot water/NaOH slurry, from which the sand is permitted to settle, and more hot water is added to the floating bitumen to dilute out the base and ensure the removal of sand. Cold water processing involves crushing tar-sand in water and floating the bitumen containing tar-sands in fuel oil, then diluting the bitumen with solvent and separating the bitumen from the sand-water residue. A more complete description of the cold water process is disclosed in U.S. Pat. No. 4,818,373 (which is incorporated by reference). Such pre-processed or pre-treated feedstocks may also be used for further processing as described herein.

Bitumens may be upgraded using the process of this disclosure, or other processes such as FCC, visbraking, hydrocracking etc. Pre-treatment of tar sand feedstocks may also include hot or cold water treatments, for example, to partially remove the sand component prior to upgrading the feedstock using the process as described herein, or other upgrading processes including FCC, hydrocracking, coking, visbreaking etc. Therefore, it is to be understood that the term "feedstock" also includes pre-treated feedstocks, including, but not limited to those prepared as described above.

It is to be understood that lighter feedstocks may also be processed following the method of the disclosure as described herein. For example, and as described in more detail below, liquid products obtained from a first pyrolytic treatment as described herein, may be further processed by the method of this disclosure (for example composite recycle and multi stage processing; see FIG. 5 and Examples 3 and 4) to obtain a liquid product characterized as having reduced viscosity, a reduced metal (especially nickel, vanadium) and water content, and a greater API. Furthermore, liquid products obtained from other processes as known in the art, for example, but not limited to U.S. Pat. No. 5,662,868; U.S. Pat. No. 4,980,045; U.S. Pat. No. 4,818,373; U.S. Pat. No. 4,569,753; U.S. Pat. No. 4,435,272; U.S. Pat. No. 4,427,538; U.S. Pat. No. 4,427,539; U.S. Pat. No. 4,328,091; U.S. Pat. No. 4,311,580; U.S. Pat. No. 4,243,514; U.S. Pat. No. 4,294,686, may also be used as feedstocks for the process described herein. Therefore, the present disclosure also contemplates the use of lighter feedstocks including gas oils, vacuum gas oils, topped crudes or pre-processed liquid products, obtained from heavy oils or bitumens. These lighter feedstocks may be treated using the process of the present disclosure in order to upgrade these feedstocks for further processing using, for example, but not limited to, FCC, visbreaking, or hydrocracking etc., or for transport and further processing.

The liquid product arising from the process as described herein may be suitable for transport within a pipeline to permit further processing of the feedstock elsewhere. Typically, further processing occurs at a site distant from where the feedstock is obtained. However, it is considered within the scope of the present disclosure that the liquid product produced using the present method may also be directly input into a unit capable of further upgrading the feedstock, such as, but not limited to, FCC, coking, visbreaking, hydrocraking, or pyrolysis etc. In this capacity, the pyrolytic reactor of the present disclosure partially upgrades the feedstock while at the same time acts as a pre-treater of the feedstock for further processing, as disclosed in, for example, but not limited to U.S. Pat. No. 5,662,868; U.S. Pat. No. 4,980,045; U.S. Pat. No. 4,818,373; U.S. Pat. No. 4,569,753; U.S. Pat. No. 4,435,272; U.S. Pat. No. 4,427,538; U.S. Pat. No. 4,427,539; U.S. Pat. No. 4,328,091; U.S. Pat. No. 4,311,580; U.S. Pat. No. 4,243,514; U.S. Pat. No. 4,294,686 (all of which are incorporated by reference herein).

The feedstocks of the present disclosure are processed using a fast pyrolysis reactor, such as that disclosed in U.S. Pat. No. 5,792,340 (WO 91/11499; EP 513,051) involving contact times between the heat carrier and feedstock from about 0.01 to about 2 sec. Other known riser reactors with short residence times may also be employed, for example, but not limited to U.S. Pat. Nos. 4,427,539, 4,569,753, 4,818,373, 4,243,514 (which are incorporated by reference).

It is preferred that the heat carrier used within the pyrolysis reactor exhibits low catalytic activity. Such a heat carrier may be an inert particulate solid, preferably sand, for example silica sand. By silica sand it is meant a sand comprising greater than about 80% silica, preferably greater than about 95% silica, and more preferably greater than about 99% silica. Other components of the silica sand may include, but are not limited to, from about 0.01% (about 100 ppm) to about 0.04% (400 ppm) iron oxide, preferably about 0.035% (358 ppm); about 0.00037% (3.78 ppm) potassium oxide; about 0.00688% (68.88 ppm) aluminum oxide; about 0.0027 (27.25) magnesium oxide; and about 0.0051% (51.14 ppm) calcium oxide. It is to be understood that the above composition is an example of a silica sand that can be used as a heat carrier as described herein, however, variations within the proportions of these ingredients within other silica sands may exist and still be suitable for use as a heat carrier. Other known inert particulate heat carriers or contact materials, for example kaolin clays, rutile, low surface area alumina, oxides of magnesium aluminum and calcium as described in U.S. Pat. No. 4,818,373 or U.S. Pat. No. 4,243,514, may also be used.

Processing of feedstocks using fast pyrolysis results in the production of product vapours and solid byproducts associated with the heat carrier. After removal of the heat carrier from the product stream, the product vapours are condensed to obtain a liquid product and gaseous by-products. For example, which is not to be considered limiting, the liquid product produced from the processing of heavy oil, as described herein, is characterized in having the following properties:

a boiling point of less than about about 600° C., preferably less than about 525° C., and more preferably less than about 500° C.;

an API gravity of at least about 12°, and preferably greater than about 17° (where API gravity=[141.5/specific gravity]−131.5; the higher the API gravity, the lighter the compound);

greatly reduced metals content, including V and Ni.

greatly reduced viscosity levels (more than 25 fold lower than that of the feedstock, for example, as determined @ 40° C.), and yields of liquid product of at least 60 vol %, preferably the yields are greater than about 70 vol %, and more preferably they are greater than about 80%.

Following the methods as described herein, a liquid product obtained from processing bitumen feedstock, which is not to be considered limiting, is characterized as having:

an API gravity from about 10 to about 21;

a density @ 15° C. from about 0.93 to about 1.0;

greatly reduced metals content, including V and Ni.

a greatly reduced viscosity of more than 20 fold lower than the feedstock (for example as determined at 40° C.), and yields of liquid product of at least 60 vol %, preferably the yields are greater than about 75 vol %.

The high yields and reduced viscosity of the liquid product produced according to this disclosure may permit the liquid product to be transported by pipeline to refineries for further processing with the addition of little or no diluents. Furthermore, the liquid products exhibit reduced levels of contaminants (e.g. metals and water), with the content of sulphur and nitrogen slightly reduced. Therefore, the liquid product may also be used as a feedstock, either directly, or following transport, for further processing using, for example, FCC, hydrocracking etc.

Figure 2:
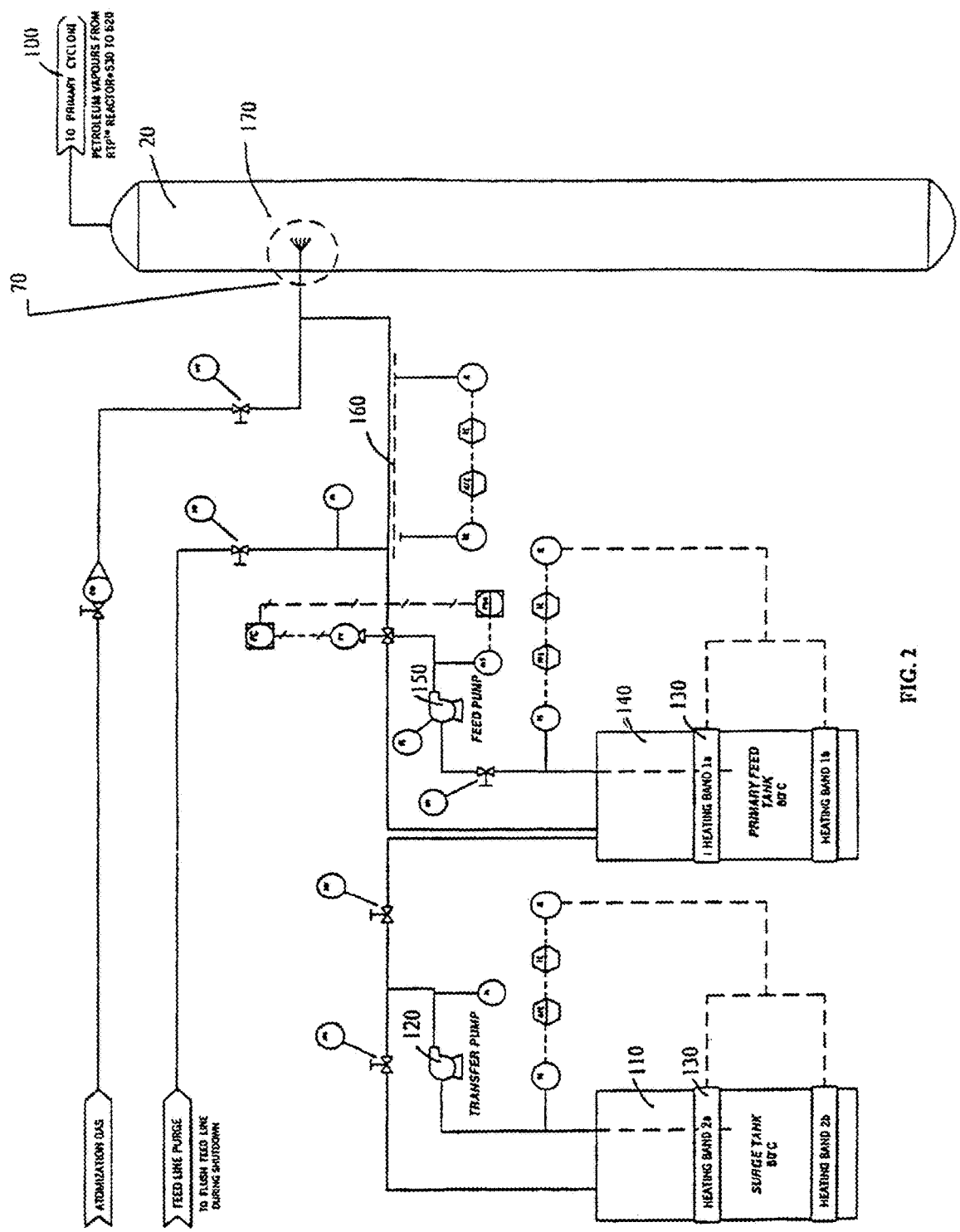
FIG. 2 is a schematic drawing of an embodiment of the present disclosure relating to the feed system for introducing the feedstock to the system for the pyrolytic processing of feedstocks.

Furthermore, the liquid products of the present disclosure may be characterised using Simulated Distillation (SimDist) analysis, as is commonly known in the art, for example but not limited to ASTM D 5307-97 or HT 750 (NCUT). SimDist analaysis, indicates that liquid products obtained following processing of heavy oil or bitumen can be characterized by any one of, or a combination of, the following properties (see Examples 1, 2 and 5):

having less than 50% of their components evolving at temperatures above 538° C. (vacuum resid fraction);

comprising from about 60% to about 95% of the product evolving below 538°. Preferably, from about 62% to about 85% of the product evolves during SimDist below 538° C. (i.e. before the vacuum resid. fraction);

having from about 1.0% to about 10% of the liquid product evolve below 193° C. Preferably from about 1.2% to about 6.5% evolves below 193° C. (i.e. before the naphtha/kerosene fraction);

having from about 2% to about 6% of the liquid product evolve between 193-232° C. Preferably from about 2.5% to about 5% evolves between 193-232° C. (kerosene fraction);

having from about 10% to about 25% of the liquid product evolve between 232-327° C. Preferably, from about 13 to about 24% evolves between 232-327° C. (diesel fraction);

having from about 6% to about 15% of the liquid product evolve between 327-360° C. Preferably, from about 6.5 to about 11% evolves between 327-360° C. (light VGO fraction);

having from about 34.5% to about 60% of the liquid product evolve between 360-538° C. Preferably, from about 35 to about 55% evolves between 360-538° C. (Heavy VGO fraction);

A first method for upgrading a feedstock to obtain liquid products with desired properties involves a one stage process. With reference to FIG. 1, briefly, the fast pyrolysis system includes a feed system generally indicated as (10; also see FIGS. 2 and 3), that injects the feedstock into a reactor (20), a heat carrier separation system that separates the heat carrier from the product vapour (e.g. 100 and 180) and recycles the heat carrier to the reheating/regenerating system (30), a particulate inorganic heat carrier reheating system (30) that reheats and regenerates the heat carrier, and primary (40) and secondary (50) condensers that collect the product. The pre-heated feedstock enters the reactor just below the mixing zone (170) and is contacted by the upward flowing stream of hot inert carrier within a transport fluid, typically a recycle gas supplied by a recycle gas line (210). A through and rapid mixing and conductive heat transfer from the heat carrier to the feedstock takes place in the short residence time conversion section of the reactor. The feedstock may enter the reactor through at least one of several locations along the length of the reactor. The different entry points indicated in FIGS. 1 and 2 are non-limiting examples of such entry locations. By providing several entry points along the length of the reactor, the length of the residence time within the reactor may be varied. For example, for longer residence times, the feedstock enters the reactor at a location lower down the reactor, while, for shorter residence times, the feedstock enters the reactor at a location higher up the reactor. In all of these cases, the introduced feedstock mixes with the upflowing heat carrier within a mixing zone (170) of the reactor. The product vapours produced during pyrolysis are cooled and collected using a suitable condenser means (40, 50) in order to obtain a liquid product.

It is to be understood that other fast pyrolysis systems, comprising differences in reactor design, that utilize alternative heat carriers, heat carrier separators, different numbers or size of condensers, or different condensing means, may be used for the preparation of the upgraded product of this disclosure. For example, which is not to be considered limiting, reactors disclosed in U.S. Pat. Nos. 4,427,539, 4,569,753, 4,818,373, 4,243,514 (all of which are incorporated by reference) may be modified to operate under the conditions as outlined herein for the production of a chemically upgraded product with an increased API and reduced viscosity.

Following pyrolysis of the feedstock in the presence of the inert heat carrier, some contaminants present within the feedstock are deposited onto the inert heat carrier. These contaminants include metals (especially nickel and vanadium), coke, and to some extent nitrogen and sulphur. The inert heat carrier therefore requires regeneration (30) before re-introduction into the reaction stream. The heat carrier may be regenerated via combustion within a fluidized bed at a temperature of about 600 to about 900° C. Furthermore, as required, deposits may also be removed from the heat carrier by an acid treatment, for example as disclosed in U.S. Pat. No. 4,818,373 (which is incorporated by reference). The heated, regenerated, heat-carrier is then re-introduced to the reactor (20) and acts as heat carrier for fast pyrolysis.

Figure 5:
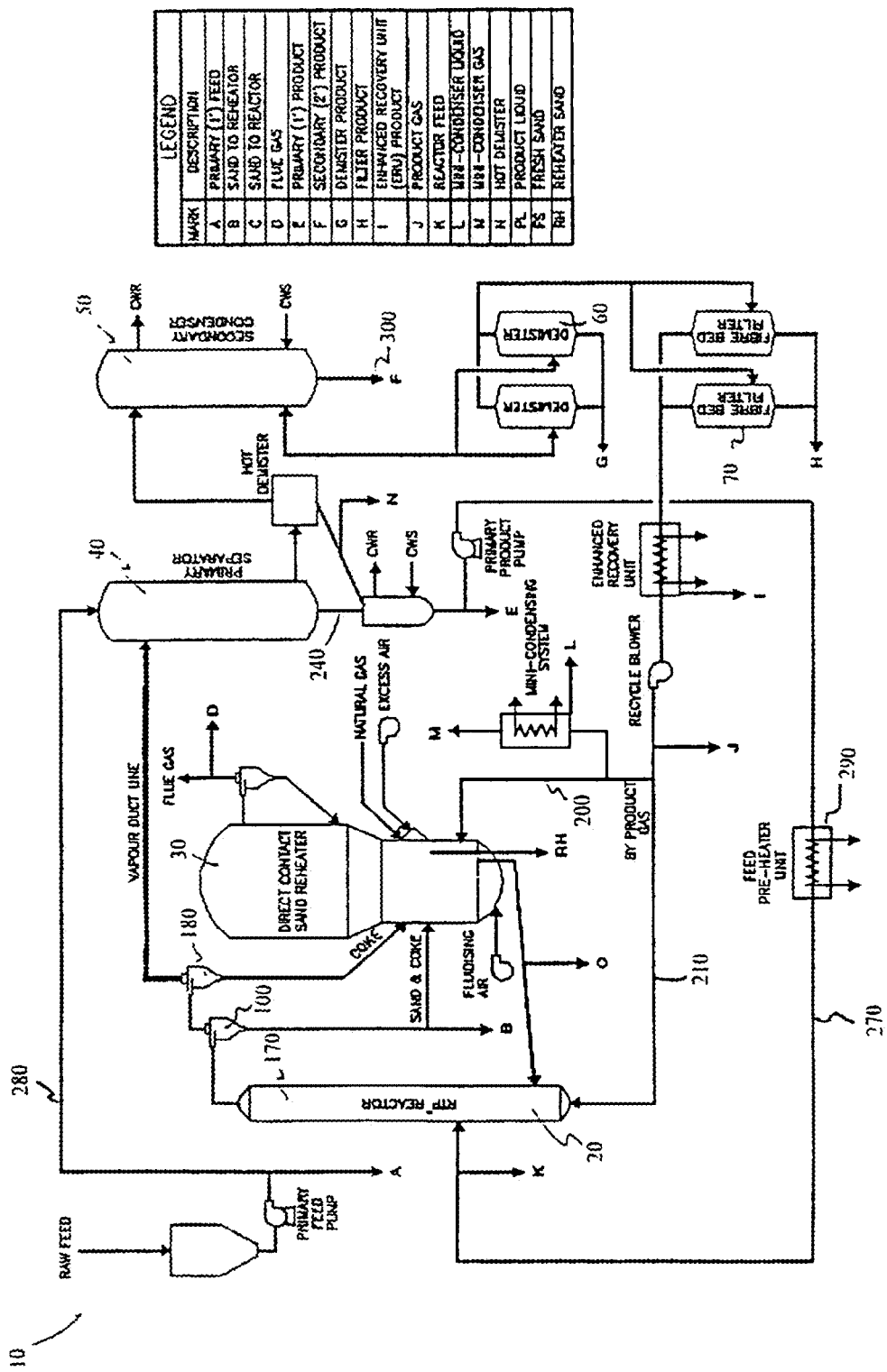
FIG. 5 is a schematic drawing of an embodiment of the present disclosure relating to a multi stage system for the pyrolytic processing of feedstocks.

The feed system (10) provides a preheated feedstock to the reactor (20). An example of a feed system which is not to be considered limiting in any manner, is shown in FIG. 2, however, other embodiments of the feed system are within the scope of the present disclosure, for example but not limited to a feed pre-heater unit as shown in FIG. 5 (discussed below) and may be optionally used in conjunction with a feed system (10; FIG. 5). The feed system (generally shown as 10, FIGS. 1 and 2) is designed to provide a regulated flow of pre-heated feedstock to the reactor unit (20). The feed system shown in FIG. 2 includes a feedstock pre-heating surge tank (110), heated using external band heaters (130) to 80° C., and is associated with a recirculation/transfer pump (120). The feedstock is constantly heated and mixed in this tank at 80° C. The hot feedstock is pumped from the surge tank to a primary feed tank (140), also heated using external band heaters (130), as required. However, it is to be understood that variations on the feed system may also be employed, in order to provide a heated feedstock to the reactor. The primary feed tank (140) may also be fitted with a recirculation/delivery pump (150). Heat traced transfer lines (160) are maintained at about 150° C. and pre-heat the feedstock prior to entry into the reactor via an injection nozzle (170). Atomization at the injection nozzle (70) positioned near the mixing zone (170) within reactor (20) may be accomplished by any suitable means. The nozzle arrangement should provide for a homogeneous dispersed flow of material into the reactor. For example, which is not considered limiting in any manner, mechanical pressure using single-phase flow atomization, or a two-phase flow atomization nozzle may be used. With a two phase flow atomization nozzle, pre-heated air, nitrogen or recycled by-product gas may be used as a carrier. Instrumentation is also dispersed throughout this system for precise feedback control (e.g. pressure transmitters, temperature sensors, DC controllers, 3-way valves gas flow meters etc.) of the system.

Conversion of the feedstock is initiated in the mixing zone (170; e.g. FIG. 1) under moderate temperatures (typically less than 750° C.) and continues through the conversion section within the reactor unit (20) and connections (e.g. piping, duct work) up until the primary separation system (e.g. 100) where the bulk of the heat carrier is removed from the product vapour stream. The solid heat carrier and solid coke by-product are removed from the product vapour stream in a primary separation unit. Preferably, the product vapour stream is separated from the heat carrier as quickly as possible after exiting from the reactor (20), so that the residence time of the product vapour stream in the presence of the heat carrier is as short as possible.

The primary separation unit may be any suitable solids separation device, for example but not limited to a cyclone separator, a U-Beam separator, or Rams Horn separator as are known within the art. A cyclone separator is shown diagrammatically in FIGS. 1, 3 and 4. The solids separator, for example a primary cyclone (100), is preferably fitted with a high-abrasion resistant liner. Any solids that avoid collection in the primary collection system are carried downstream and recovered in a secondary collection system (180). The secondary separation unit may be the same as the primary separation unit, or it may comprise an alternate solids separation device, for example but not limited to a cyclone separator, a ¼ turn separator, for example a Rams Horn separator, or an impingement separator, as are known within the art. A secondary cyclone separator (180) is graphically represented in FIGS. 1 and 4, however, other separators may be used as a secondary separator unit.

The solids that have been removed in the primary and secondary collection systems are transferred to a vessel for regeneration of the heat carrier, for example, but not limited to a direct contact reheater system (30). In a direct contact reheater system (30), the coke and by-product gasses are oxidized to provide processes thermal energy which is directly carried to the solid heat carrier, as well as regenerating the heat carrier. The temperature of the direct contact reheater is maintained independent of the feedstock conversion (reactor) system. However, as indicated above, other methods for the regeneration of the heat carrier may be employed, for example but not limited to, acid treatment.

The hot product stream from the secondary separation unit is quenched in a primary collection column (or primary condenser, 40; FIG. 1). The vapour stream is rapidly cooled from the conversion temperature to less than about 400° C. Preferably the vapour stream is cooled to about 300° C. Product is drawn from the primary column and pumped (220) into product storage tanks A secondary condenser (50) can be used to collect any material that evades the primary condenser (40). Product drawn from the secondary condenser (50) is also pumped (230) into product storage tanks. The remaining non-condensible gas is compressed in a blower (190) and a portion is returned to the heat carrier regeneration system (30) via line (200), and the remaining gas is returned to the reactor (20) by line (210) and acts as a heat carrier, and transport, medium.

It is preferred that the reactor used with the process of the present disclosure is capable of producing high yields of liquid product for example at least greater than 60 vol %, preferably the yield is greater than 70 vol %, and more preferably the yield is greater than 80%, with minimal byproduct production such as coke and gas. Without wishing to limit the scope of the disclosure in any manner, an example for the suitable conditions for a the pyrolytic treatment of feedstock, and the production of a liquid product is described in U.S. Pat. No. 5,792,340, which is incorporated herein by reference. This process utilizes sand (silica sand) as the heat carrier, and a reactor temperature ranging from about 480° to about 620° C., loading ratios of heat carrier to feedstock from about 10:1 to about 200:1, and residence times from about 0.35 to about 0.7 sec. Preferably the reactor temperature ranges from about 500° to about 550° C. The preferred loading ratio is from about 15:1 to about 50:1, with a more preferred ratio from about 20:1 to about 30:1. Furthermore, it is to be understood that longer residence times within the reactor, for example up to about 5 sec, may be obtained if desired by introducing the feedstock within the reactor at a position towards the base of the reactor, by increasing the length of the reactor itself, by reducing the velocity of the heat carrier through the reactor (provided that there is sufficient velocity for the product vapour and heat carrier to exit the reactor), or a combination thereof. The preferred residence time is from about 0.5 to about 2 sec.

Without wishing to be bound by theory, it is thought that the chemical upgrading of the feedstock that takes place within the reactor system as described above is in part due to the high loading ratios of feedstock to heat carrier that are used within the method of the present disclosure. Prior art loading ratios typically ranged from 5:1 to about 12.5:1. However, the loading ratios as described herein, of from about 15:1 to about 200:1, result in a very rapid, ablative and consistent transfer of heat from the heat carrier to the feedstock. The high volume and density of heat carrier within the mixing and conversion zones, ensures that a rapid and even processing temperature is achieved and maintained. In this way the temperatures required for cracking process described herein are easily controlled. This also allows for the use of relatively low temperatures to minimize over cracking, while ensuring that mild cracking of the feedstock is still achieved. Furthermore, with an increased density of heat carrier within the reactor, contaminants and undesired components present in the feedstock and reaction by-products, including metals (e.g. nickel and vanadium), coke, and to some extent nitrogen and sulphur, are readily adsorbed due to the large surface area of heat carrier present. This ensures efficient and optimal removal of contaminants from the feedstock, during the pyrolytic processing of the feedstock. As a larger surface area of heat carrier is employed, the heat carrier itself is not unduly contaminated, and any adsorbed metal or coke and the like is readily stripped during regeneration of the heat carrier. With this system the residence times can be carefully regulated in order to optimize the processing of the feedstock and liquid product yields.

The liquid product arising from the processing of heavy oil as described herein has significant conversion of the resid fraction when compared to heavy oil or bitumen feedstock. As a result the liquid product of the present disclosure, produced from the processing of heavy oil is characterized, for example, but which is not to be considered limiting, as having an API gravity of at least about 13°, and more preferably of at least about 17°. However, as indicated above, higher API gravities may be achieved with a reduction in volume. For example, one liquid product obtained from the processing of heavy oil using the method of the present disclosure is characterized as having from about 10 to about 15% by volume bottoms, from about 10 to about 15% by volume light ends, with the remainder as middle distillates.

The viscosity of the liquid product produced from heavy oil is substantially reduced from initial feedstock levels, of from 250 cSt 80° C., to product levels of 4.5 to about 10 cSt 80° C., or from about 6343 cSt @ 40° C., in the feedstock, to about 15 to about 35 cSt @ 40° C. in the liquid product. Following a single stage process, liquid yields of greater than 80 vol % and API gravities of about 17, with viscosity reductions of at least about 25 times that of the feedstock are obtained (@ 40° C.). These viscosity levels are suitable for pipeline transport of the liquid product. Results from Simulated Distillation (SimDist; e.g. ASTM D 5307-97, HT 750, (NCUT)) analysis further reveals substantially different properties between the feedstock and liquid product as produced herein. For heavy oil feedstock, approx. 1% (wt %) of the feedstock is distilled off below about 232° C. (Kerosene fraction), approx. 8.7% from about 232° to about 327° C. (Diesel fraction), and 51.5% evolved above 538° C. (Vacuum resid fraction; see Example 1 for complete analysis) SimDist analysis of the liquid product produced as described above may be characterized as having, but is not limited to having, the following properties: approx. 4% (wt %) evolving below about 232° C. (Kerosene fraction), approx. 14.2% from about 232° to about 327° C. (Diesel fraction), and 37.9% within the vacuum resid fraction (above 538° C.). It is to be understood that modifications to these values may arise depending upon the composition of the feedstock used. These results demonstrate that there is a significant alteration in many of the components within the liquid product when compared with the heavy oil feedstock, with a general trend to lower molecular weight components that evolve earlier during SimDist analysis following rapid thermal processing.

Therefore, the present disclosure is directed to a liquid product obtained from single stage processing of heavy oil may that may be characterised by at least one of the following properties:

- having less than 50% of their components evolving at temperatures above 538° C. (vacuum resid fraction);
- comprising from about 60% to about 95% of the product evolving below 538°. Preferably, from about 60% to about 80% evolves during Simulated Distillation below 538° C. (i.e. before the vacuum resid. fraction);
- having from about 1.0% to about 6% of the liquid product evolve below 193° C. Preferably from about 1.2% to about 5% evolves below 193° C. (i.e. before the naphtha/kerosene fraction);
- having from about 2% to about 6% of the liquid product evolve between 193-232° C. Preferably from about 2.8% to about 5% evolves between 193-232° C. (diesel fraction);
- having from about 12% to about 25% of the liquid product evolve between 232-327° C. Preferably, from about 13 to about 18% evolves between 232-327° C. (diesel fraction);
- having from about 5% to about 10% of the liquid product evolve between 327-360° C. Preferably, from about 6.0 to about 8.0% evolves between 327-360° C. (light VGO fraction);
- having from about 40% to about 60% of the liquid product evolve between 360-538° C. Preferably, from about 30 to about 45% evolves between 360-538° C. (Heavy VGO fraction);

Similarly following the methods as described herein, a liquid product obtained from processing bitumen feedstock following a single stage process, is characterized as having, and which is not to be considered as limiting, an increase in API gravity of at least about 10 (feedstock API is typically about 8.6). Again, higher API gravities may be achieved with a reduction in volume. The product obtained from bitumen is also characterised as having a density from about 0.93 to about 1.0 and a greatly reduced viscosity of at least about 20 fold lower than the feedstock (i.e. from about 15 g/ml to about 60 g/ml at 40° C. in the product, v. the feedstock comprising about 1500 g/ml). Yields of liquid product obtained from bitumen are at least 60% by vol, and preferably greater than about 75% by vol. SimDist analysis also demonstrates significantly different properties between the bitumen feedstock and liquid product as produced herein. Highlights from SimDist analysis indicates that for a bitumen feedstock, approx. 1% (wt %) of the feedstock was distilled off below about 232° C. (Kerosene fraction), approx. 8.6% from about 232° to about 327° C. (Diesel fraction), and 51.2% evolved above 538° C. (Vacuum resid fraction; see Example 2 for complete analysis). SimDist analysis of the liquid product produced from bitumen as described above may be characterized, but is not limited to the following properties: approx. 5.7% (wt %) is evolved below about 232° C. (Kerosene fraction), approx. 14.8% from about 232° to about 327° C. (Diesel fraction), and 29.9% within the vacuum resid fraction (above 538° C.).

Again, these results may differ depending upon the feedstock used, however, they demonstrate the significant alteration in many of the components within the liquid product when compared with the bitumen feedstock, and the general trend to lower molecular weight components that evolve earlier during SimDist analysis in the liquid product produced from rapid thermal processing.

Therefore, the present disclosure is also directed to a liquid product obtained from single stage processing of bitumen which is characterised by having at least one of the following properties:

- having less than 50% of their components evolving at temperatures above 538° C. (vacuum resid fraction);
- comprising from about 60% to about 95% of the product evolving below 538°. Preferably, from about 60% to about 80% evolves during Simulated Distillation below 538° C. (i.e. before the vacuum resid. fraction);
- having from about 1.0% to about 6% of the liquid product evolve below 193° C. Preferably from about 1.2% to about 5% evolves below 193° C. (i.e. before the naphtha/kerosene fraction);
- having from about 2% to about 6% of the liquid product evolve between 193-232° C. Preferably from about 2.0% to about 5% evolves between 193-232° C. (diesel fraction);
- having from about 12% to about 25% of the liquid product evolve between 232-327° C. Preferably, from about 13 to about 18% evolves between 232-327° C. (diesel fraction);
- having from about 5% to about 10% of the liquid product evolve between 327-360° C. Preferably, from about 6.0 to about 8.0% evolves between 327-360° C. (light VGO fraction);
- having from about 40% to about 60% of the liquid product evolve between 360-538° C. Preferably, from about 30 to about 50% evolves between 360-538° C. (Heavy VGO fraction);

The liquid product produced as described herein also exhibits a high degree of stability. Analysis of the liquid product over a 30 day period indicates negligible change in SimDist profile, viscosity, API and density for liquid products produced from either heavy oil or bitumen feedstocks (see Example 1 and 2).

Because the crack is not as severe, and the residence time short, unwanted reactions that can generate excessive amounts of undesirable aromatics and olefins. Furthermore, it has been found that contaminants such as metals and water are significantly reduced. There is no concentration of contaminants in the liquid product.

Also as disclosed herein, further processing of the liquid product obtained from the process of heavy oil or bitumen feedstock may take place following the method of this disclosure. Such further processing may utilize conditions that are very similar to the initial fast pyrolysis treatment of the feedstock, or the conditions may be modified to enhance removal of lighter products (a single-stage process with a mild crack) followed by more severe cracking of the recycled fraction (i.e. a two stage process).

In the first instance, that of further processing under similar conditions the liquid product from a first pyrolytic treatment is recycled back into the pyrolysis reactor in order to further upgrade the properties of the final product to produce a lighter product. In this arrangement the liquid product from the first round of pyrolysis is used as a feedstock for a second round of pyrolysis after the lighter fraction of the product has been removed from the product stream. Furthermore, a composite recycle may also be carried out where the heavy fraction of the product stream of the first process is fed back (recycled) into the reactor along with the addition of fresh feedstock (e.g. FIG. 3, described in more detail below).

Figure 3:
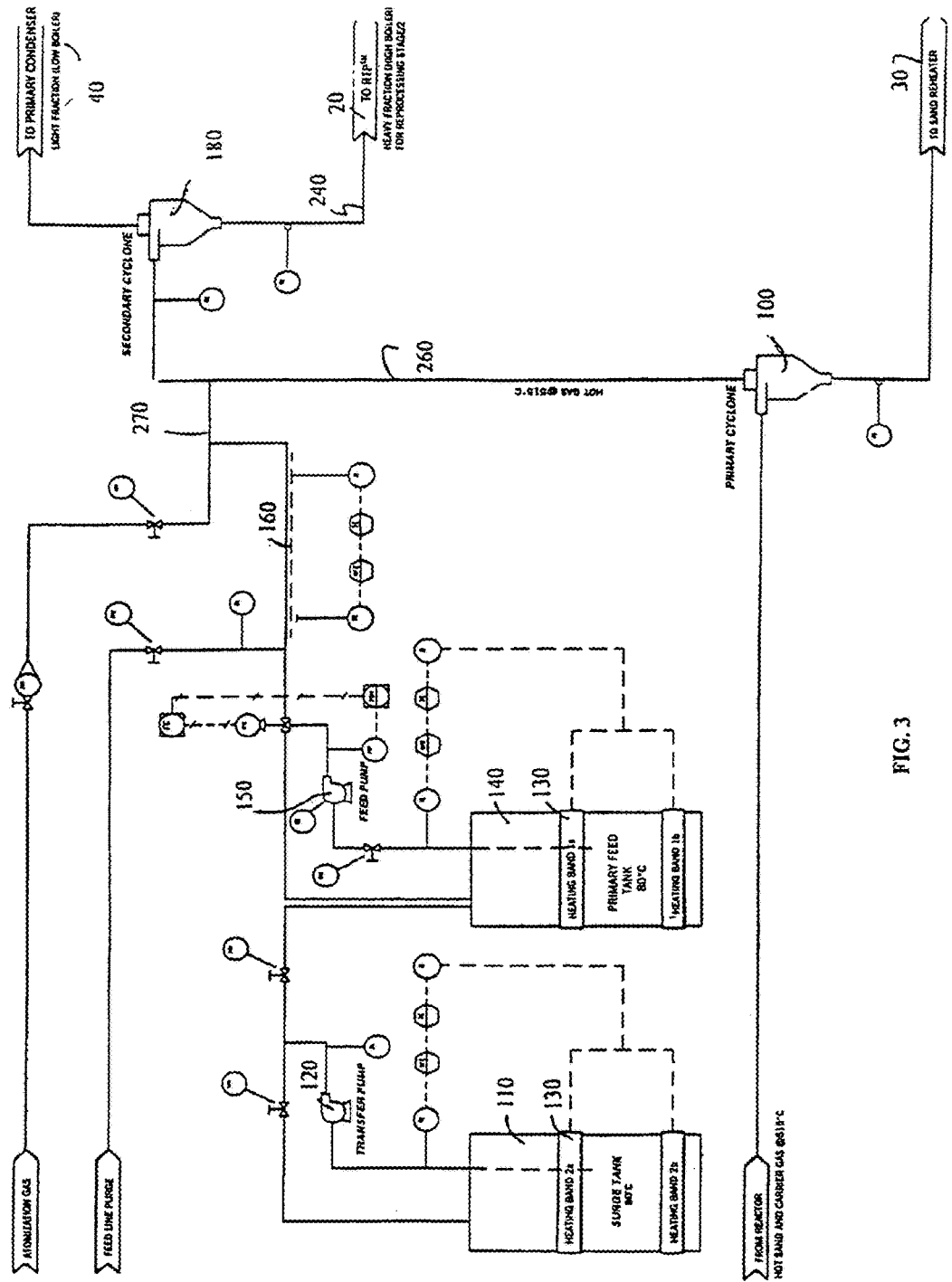
FIG. 3 is a schematic drawing of an embodiment of the present disclosure relating to the feed system for introducing feedstock into the second stage of a two stage process using the system for the pyrolytic processing of feedstocks as described herein.
Figure 4:
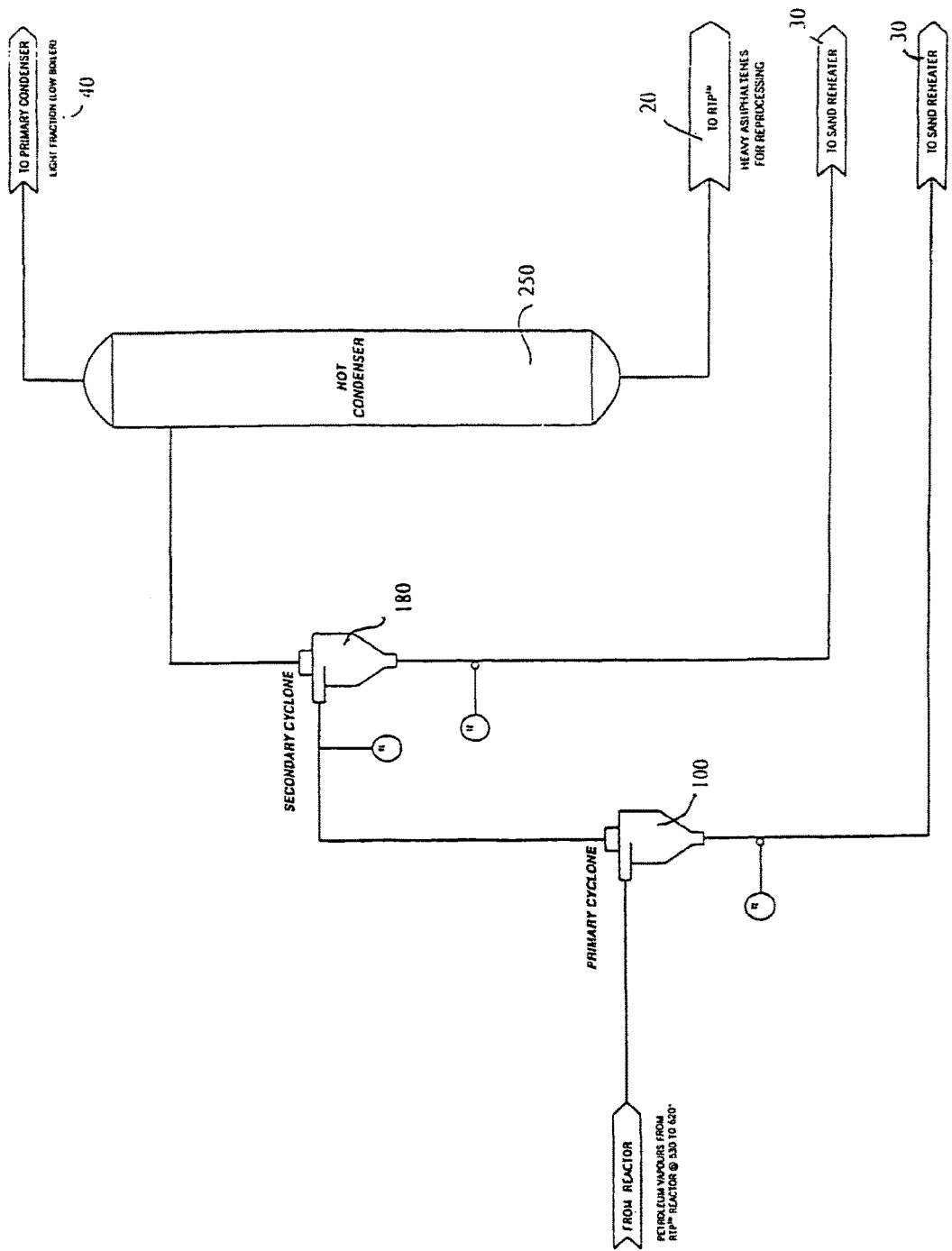
FIG. 4 is a schematic drawing of an embodiment of the present disclosure relating to the recovery system for obtaining feedstock to be either collected from a primary condenser, or recycled to the second stage of a two stage process using the system for the pyrolytic processing of feedstocks as described herein.

The second method for upgrading a feedstock to obtain liquid products with desired properties involves a two-stage pyrolytic process (see FIGS. 2 and 3). This two stage processes comprises a first stage where the feedstock is exposed to conditions that mildly cracks the hydrocarbon components in order to avoid overcracking and excess gas and coke production. An example of these conditions includes, but is not limited to, injecting the feedstock at about 150° C. into a hot gas stream comprising the heat carrier at the inlet of the reactor. The feedstock is processed with a residence time less than about one second within the reactor at less than 500° C., for example 300° C. The product, comprising lighter materials (low boilers) is separated (100, and 180, FIG. 3), and removed following the first stage in the condensing system (40). The heavier materials (240), separated out at the bottom of the condenser (40) are collected subjected to a more severe crack within the reactor (20) in order to render a liquid product of reduced viscosity and high yield. The conditions utilized in the second stage include, but are not limited to, a processing temperature of about 530° to about 590° C. Product from the second stage is processed and collected as outlined in FIG. 1 using a primary and secondary cyclone (100, 180, respectively) and primary and secondary condensers (40 and 50, respectively).

Following such a two stage process, an example of the product, which is not to be considered limiting, of the first stage (light boilers) is characterized with a yield of about 30 vol %, an API of about 19, and a several fold reduction in viscosity over the initial feedstock. The product of the high boiler fraction, produced following the processing of the recycle fraction in the second stage, is typically characterized with a yield greater than about 75 vol %, and an API gravity of about 12, and a reduced viscosity over the feedstock recycled fraction. SimDist analysis for liquid product produced from heavy oil feedstock is characterized with approx. 7.4% (wt %) of the feedstock was distilled off below about 232° C. (Kerosene fraction v. 1.1% for the feedstock), approx. 18.9% from about 232° to about 327° C. (Diesel fraction v. 8.7% for the feedstock), and 21.7% evolved above 538° C. (Vacuum resid fraction v. 51.5% for the feedstock; see Example 1 for complete analysis). SimDist analysis for liquid product produced from bitumen feedstock is characterized with approx. 10.6% (wt %) of the feedstock was distilled off below about 232° C. (Kerosene fraction v. 1.0% for the feedstock), approx. 19.7% from about 232° to about 327° C. (Diesel fraction v. 8.6% for the feedstock), and 19.5% evolved above 538° C. (Vacuum resid fraction v. 51.2% for the feedstock; see Example 2 for complete analysis).

Alternate conditions of a two stage process may include a first stage run where the feedstock is preheated to 150° C. and injected into the reactor and processed at about 530° to about 620° C., and with a residence time less than one second within the reactor (see FIG. 2). The product is collected using primary and secondary cyclones (100 and 180, respectively, FIGS. 2 and 4), and the remaining product is transferred to a hot condenser (250). The condensing system (FIG. 4) is engineered to selectively recover the heavy ashphaltene components using a hot condenser (250) placed before the primary condenser (40). The heavy alsphaltenes are collected and returned to the reactor (20) for further processing (i.e. the second stage). The second stage utilizes reactor conditions operating at higher temperatures, or longer residence times, or at higher temperatures and longer residence times (e.g. injection at a lower point in the reactor), than that used in the first stage to optimize the liquid product. Furthermore, a portion of the product stream may be recycled to extinction following this method.

Yet another modification of the composite and two stage processing systems, termed "multi-stage" processing, comprises introducing the primary feedstock (raw feed) into the primary condenser (see FIG. 5) via line 280, and using the primary feedstock to rapidly cool the product vapours within the primary condenser. Product drawn from the primary condenser, is then recycled to the reactor via line 270 for combined "first stage" and "second stage" processing (i.e. recycled processing). The recycled feedstock is exposed to conditions that mildly crack the hydrocarbon components in order to avoid overcracking and excess gas and coke production. An example of these conditions includes, but is not limited to, injecting the feedstock at about 150° C. into a hot gas stream comprise the heat carrier at the inlet of the reactor. The feedstock is processed with a residence time of less than about two seconds within the reactor at a temperature of between about 500° C. to about 600° C. Preferably, the residence time is from about 0.8 to about 1.3 sec., and the reactor temperature is from about 520° to about 580° C. The product, comprising lighter materials (low boilers) is separated (100, and 180, FIG. 5), and removed in the condensing system (40). The heavier materials (240), separated out at the bottom of the condenser (40) are collected and reintroduced into the reactor (20) via line 270. Product gasses that exit the primary condenser (40) enter the secondary condenser (50) where a liquid product of reduced viscosity and high yield (300) is collected (see Example % for run analysis using this method). With multi-stage processing, the feedstock is recycled through the reactor in order to produce a product that can be collected from the second condenser, thereby upgrading and optimizing the properties of the liquid product.

Alternate feeds systems may also be used as required for one, two, composite or multi stage processing. For example, in the system outlined FIG. 5, the feedstock (primary feedstock or raw feed) is obtained from the feed system (10), and is transported within line (280; which may be heated as previously described) to a primary condenser (40). The primary product obtained from the primary condenser may also be recycled back to the reactor (20) within a primary product recycle line (270). The primary product recycle line may be heated if required, and may also comprise a pre-heater unit (290) as shown in FIG. 5, to re-heat the recycled feedstock to desired temperature for introduction within the reactor (20).

Following the recycle process as outlined above and graphically represented in FIG. 5, product with yields of greater than 60, and preferably above 75% (wt %), and with the following characteristics, which are not to be considered limiting in any manner, may be produced from either bitumen or heavy oil feedstocks: an API from about 14 to about 19; viscosity of from about 20 to about 100 (cSt @ 40° C.); and a low metals content (see Example 5).

From SimDist analaysis, liquid products obtained following multi-stage processing of heavy oil can be characterized by comprising at least one of the following properties:
having less than 50% of their components evolving at temperatures above 538° C. (vacuum resid fraction);
comprising from about 60% to about 95% of the product evolving below 538°. Preferably, from about 70% to about 90%, and more preferably from about 75 to about 87% of the product evolves during Simulated Distillation below 538° C. (i.e. before the vacuum resid. fraction);

having from about 1.0% to about 6% of the liquid product evolve below 193° C. Preferably from about 1.2% to about 5%, and more preferably from about 1.3% to about 4.8% evolves below 193° C. (i.e. before the naphtha/kerosene fraction);

having from about 2% to about 6% of the liquid product evolve between 193-232° C. Preferably from about 2.8% to about 5% evolves between 193-232° C. (diesel fraction);

having from about 15% to about 25% of the liquid product evolve between 232-327° C. Preferably, from about 18.9 to about 23.1% evolves between 232-327° C. (diesel fraction);

having from about 8% to about 15% of the liquid product evolve between 327-360° C. Preferably, from about 8.8 to about 10.8% evolves between 327-360° C. (light VGO fraction);

having from about 40% to about 60% of the liquid product evolve between 360-538° C. Preferably, from about 42 to about 55% evolves between 360-538° C. (Heavy VGO fraction);

The liquid product obtained from multi-stage processing of bitumen may be charachterized as having at least one of the following properties:

having less than 50% of their components evolving at temperatures above 538° C. (vacuum resid fraction);

comprising from about 60% to about 95% of the product evolving below 538°. Preferably, from about 60% to about 85% evolves during Simulated Distillation below 538° C. (i.e. before the vacuum resid. fraction);

having from about 1.0% to about 8% of the liquid product evolve below 193° C. Preferably from about 1.5% to about 7% evolves below 193° C. (i.e. before the naphtha/kerosene fraction);

having from about 2% to about 6% of the liquid product evolve between 193-232° C. Preferably from about 2.5% to about 5% evolves between 193-232° C. (diesel fraction);

having from about 12% to about 25% of the liquid product evolve between 232-327° C. Preferably, from about 15 to about 20% evolves between 232-327° C. (diesel fraction);

having from about 5% to about 12% of the liquid product evolve between 327-360° C. Preferably, from about 6.0 to about 10.0% evolves between 327-360° C. (light VGO fraction);

having from about 40% to about 60% of the liquid product evolve between 360-538° C. Preferably, from about 35 to about 50% evolves between 360-538° C. (Heavy VGO fraction);

Collectively these results show that a substantial proportion of the components with low volatility in either of the feedstocks have been converted to components of higher volatility (light naphtha, kerosene and diesel) in the liquid product. These results demonstrate that the liquid product are substantially upgraded, and exhibits properties suitable for transport.

The above description is not intended to limit the claimed invention in any manner, furthermore, the discussed combination of features might not be absolutely necessary for the inventive solution.

The present disclosure will be further illustrated in the following examples. However it is to be understood that these examples are for illustrative purposes only, and should not be used to limit the scope of the present disclosure in any manner.

Example 1: Heavy Oil (Single Stage)

Pyrolytic processing of Saskatchewan Heavy Oil and Athabasca Bitumen (see Table 1) were carried out over a range of temperatures using a pyrolysis reactor as described in U.S. Pat. No. 5,792,340.

TABLE 1

Characteristics of heavy oil and bitumen feedstocks

| Compound | Heavy Oil [1] | Bitumen [2] |
|---|---|---|
| Carbon (wt %) | 84.27 | 83.31 |
| Hydrogen (wt %) | 10.51 | 10.31 |
| Nitrogen (wt %) | <0.5 | <0.5 |
| Sulphur (st %) | 3.6 | 4.8 |
| Ash (wt %) | 0.02 | 0.02 |
| Vanadium (ppm) | 127 | 204 |
| Nickel (ppm) | nd | 82 |
| Water content (wt %) | 0.8 | 0.19 |
| Gravity API° | 11.0 | 8.6 |
| Viscosity @ 40° C. (cSt) | 6343 | 30380 |
| Viscosity @ 60° C. (cSt) | 892.8 | 1268.0 |
| Viscosity @ 80° C. (cSt) | 243.4 | 593.0 |
| Aromaticity (C13 NMR) | 0.31 | 0.35 |

[1]Saskatchewan Heavy Oil
[2]Athabasca Bitumen (neat)

Briefly the conditions of processing include a reactor temperature from about 500° to about 620° C. Loading ratios for particulate heat carrier (silica sand) to feedstock of from about 20:1 to about 30:1 and residence times from about 0.35 to about 0.7 sec. These conditions are outlined in more detail below (Table 2).

TABLE 2

Single stage processing of Saskatchewan Heavy Oil

| Crack Temp ° C. | Viscosity @ 40° C. (cSt) | Yield wt % | Density @ 15° g/ml | API° | Yield Vol % |
|---|---|---|---|---|---|
| 620 | 4.6[1] | 71.5 | 0.977 | 13.3 | 72.7 |
| 592 | 15.2[1] | 74.5 | 0.970 | 14.4 | 76.2 |
| 590 | 20.2 | 70.8 | 0.975 | 13.6 | 72.1 |
| 590 | 31.6 | 75.8 | 0.977 | 13.3 | 77.1 |
| 560 | 10.01[1] | 79.9[2] | 0.963 | 15.4 | 82.3[2] |
| 560 | 10.01[1] | 83.0[3] | 0.963 | 16.2[3] | 86.3[3] |
| 550 | 20.8 | 78.5 | 0.973 | 14.0 | 80.3 |
| 550[4] | 15.7 | 59.8[2] | 0.956 | 16.5 | 61.5[2] |
| 550[4] | 15.7 | 62.0[3] | 0.956 | 18.3[2,3] | 65.1[3] |
| 530 | 32.2 | 80.9[2] | 0.962 | 15.7 | 82.8[2] |
| 530 | 32.2 | 83.8[3] | 0.962 | 16.6[3] | 87.1[3] |

[1]Viscosity @ 80° C.
[2]Yields do not include overhead condensing
[3]Estimated yields and API with overhead condensing
[4]Not all of the liquids were captured in this trial.

The liquid products of the runs at 620° C., 592° C. and 560° C. were analysed for metals, water and sulphur content. These results are shown in Table 3. Nickel, Vanadium and water levels were reduced 72, 69 and 87%, respectively, while sulphur and nitrogen remained the same or were marginally reduced. No metals were concentrated in the liquid product.

TABLE 3

Metal Analysis of Liquid Products (ppm)[1]

| Component | Saskatchewan Heavy Oil | Run @ 620° C. | Run @ 592° C. | Run @ 560° C. |
|---|---|---|---|---|
| Aluminum | <1 | <1 | 11 | <1 |
| Iron | <1 | 2 | 4 | <1 |
| Nickel | 44 | 10 | 12 | 9 |
| Zinc | 2 | <1 | 2 | 1 |
| Calcium | 4 | 2 | 3 | 1 |
| Magnesium | 3 | 1 | 2 | <1 |
| Boron | 21 | 42 | 27 | <1 |
| Sodium | 6 | 5 | 5 | 4 |
| Silicon | 1 | 10 | 140 | 4 |
| Vanadium | 127 | 39 | 43 | 39 |
| Potassium | 7 | 7 | <1 | 4 |
| Water (wt %) | 0.78 | 0.19 | 0.06 | .10 |
| Sulphur (wt %) | 3.6 | 3.5 | 3.9 | 3.5 |

[1]Copper, tin, chromium, lead, cadmium, titanium, molybdenum, barium and manganese all showed less than 1 ppm in feedstock and liquid products.

The gas yields for two runs are presented in Table 4.

TABLE 4

Gas analysis of Pyrolysis runs

| Gas (wt %) | Run @ 620° C. | Run @ 560° C. |
|---|---|---|
| Total Gas Yield | 11.8 | 7.2 |
| Ethylene | 27.0 | 16.6 |
| Ethane | 8.2 | 16.4 |
| Propylene | 30.0 | 15.4 |
| Methane | 24.0 | 21.0 |

The pour point of the feedstock improved and was reduced from 32° F. to about −54° F. The Conradson carbon reduced from 12. wt % to about 6.6 wt %.

Based on the analysis of these runs, higher API values and product yields were obtained for crack temperatures of about 530 to about 560° C. At these temperatures, API gravities of 14 to 18.3, product yields of from about 80 to about 87 vol %, and viscosities of from about 15 to about 35 cSt (@40° C.) or about 10 cST (@80° C.) were obtained (the yields from the 550° C. run are not included in this range as the liquid yield capture was not optimized during this run). These liquid products reflect a significant degree of upgrading, and exhibit qualities suitable for pipeline transport.

Simulated distillation (SimDist) analysis of feedstock and liquid product obtained from several separate runs is present in Table 5. SimDist analysis followed the protocol outlined in ASTM D 5307-97, which reports the residue as anything with a boiling point higher than 538° C. Other methods for SimDist may also be used, for example HT 750 (NCUT; which includes boiling point distribution through to 750° C.). These results indicate that over 50% of the components within the feedstock evolve at temperatures above 538° C. These are high molecular weight components with low volatility. Conversely, in the liquid product, the majority of the components, approx 62.1% of the product are more volatile and evolve below 538° C.

TABLE 5

SimDist anlaysis of feedstock and liquid product after single stage processing (Reactor temp 538° C.)

| Fraction | Temp (° C.) | Feedstock | R245 |
|---|---|---|---|
| Light Naphtha | <71 | 0.0 | 0.5 |
| Light/med Naphtha | 71-100 | 0.0 | 0.3 |
| Med Naphtha | 100-166 | 0.0 | 1.4 |
| Naphtha/Kerosene | 166-193 | 0.1 | 1.0 |
| Kerosene | 193-232 | 1.0 | 2.8 |
| Diesel | 232-327 | 8.7 | 14.2 |
| Light VGO | 327-360 | 5.2 | 6.5 |
| Heavy VGO | 360-538 | 33.5 | 35.2 |
| Vacuum Resid. | >538 | 51.5 | 37.9 |

The feedstock can be further characterized with approx. 0.1% of its components evolving below 193° C. (naphtha/kerosene fraction), v. approx. 6% for the liquid product. The diesel fraction also demonstrates significant differences between the feedstock and liquid product with 8.7% and 14.2% evolving at this temperature range (232-327° C.), respectively. Collectively these results show that a substantial proportion of the components with low volatility in the feedstock have been converted to components of higher volatily (light naphtha, kerosene and diesel) in the liquid product.

Stability of the liquid product was also determined over a 30 day period (Table 6). No significant change in the viscosity, API or density of the liquid product was observed of a 30 day period.

TABLE 6

Stabilty of liquid products after single stage processing

| Fraction | Time = 0 | 7 days | 14 days | 30 days |
|---|---|---|---|---|
| Density @ 15.6° C. (g/cm3) | 0.9592 | 0.9590 | 0.9597 | 0.9597 |
| API (deg. API) | 15.9 | 15.9 | 15.8 | 15.8 |
| Viscosity @ 40° C. (cSt) | 79.7 | 81.2 | 81.2 | 83.2 |

Example 2 Bitumen (Single Stage)

Several runs using Athabaska Bitumen were conducted using the pyrolysis reactor described in U.S. Pat. No. 5,792,340. The conditions of processing included a reactor temperature from 520° to about 590° C. Loading ratios for particulate heat carrier to feedstock of from about 20:1 to about 30:1, and residence times from about 0.35 to about 1.2 sec. These conditions, and the resulting liquid products are outlined in more detail below (Table 7).

TABLE 7

Single Stage Processing with Undiluted Athabasca Bitumen

| Crack Temp | Viscosity @ 40° C. (cSt) | Yield wt % | Density @ 15° C. | Metals V (ppm)* | Metals Ni (ppm)** | API |
|---|---|---|---|---|---|---|
| 519° C. | 205 | 81.0 | nd | nd | nd | 13.0 |
| 525° C. | 201 | 74.4 | 0.979 | 88 | 24 | 12.9 |
| 528° C. | 278 | 82.7 | nd | nd | nd | 12.6 |
| 545° C. | 151 | 77.4 | 0.987 | 74 | 27 | 11.8 |
| 590° C. | 25.6 | 74.6 | 0.983 | rid | nd | 12.4 |

*feedstock V 209 ppm
**feedstock Ni 86 ppm

These results indicates that undiluted bitumen may be processed according to the method of this disclosure to produce a liquid product with reduced viscosity from greater than 1300 cSt (@ 40° C.) to about 25.6-200 cSt (@40° C. (depending on the run conditions; see also Tables 8 and 9), with yields of over 75% to about 85%, and an improvement in the product API from 8.6 to about 12-13. Again, as per Example 1, the liquid product exhibits substantial upgrading of the feedstock. SinaDist analysis, and other properties of the liquid product are presented in Table 8, and stability studies in Table 9.

TABLE 8

Properties and SimDist analysis of feedstock and liquid product after single stage processing (Reactor temp. 545° C.).

| | | | R239 | |
|---|---|---|---|---|
| Fraction | Temp (° C.) | Feedstock | 14 days | 30 days |
| Density @ 15.5° C. | — | — | 0.9871 | 0.9876 |
| API | — | — | 11.7 | 11.6 |
| Viscosity @ 40° C. | — | — | 162.3 | 169.4 |
| Light Naphtha | <71 | 0.0 | 0.2 | 0.1 |
| Light-med Naphtha | 71-100 | 0.0 | 0.2 | 0.2 |
| Med Naphtha | 100-166 | 0.0 | 1.5 | 1.4 |
| Naphtha/Kerosne | 166-193 | 0.1 | 1.0 | 1.0 |
| Kerosene | 193-232 | 0.9 | 3.1 | 3.0 |
| Diesel | 232-327 | 8.6 | 15.8 | 14.8 |
| Light VGO | 327-360 | 5.2 | 7.9 | 7.6 |
| Heavy VGO | 360-538 | 34.0 | 43.9 | 42.0 |
| Vacuum Resid. | >538 | 51.2 | 26.4 | 29.9 |

TABLE 9

Stabilty of liquid products after single stage processing (reactor temperature 525° C.)

| Fraction | Temp (° C.) | Feedstock | R232 day 0 | 7 days | 14 days | 30 days |
|---|---|---|---|---|---|---|
| Density @ 15.6@C* | — | 1.0095 | 0.979 | 0.980 | 0.981 | 0.981 |
| API | — | — | 8.5 | 12.9 | 12.7 | 12.6 | 12.6 |
| Viscosity @ 40° C.** | — | 30380 | 201.1 | 213.9 | 214.0 | 218.5 |
| Light Naphtha | <71 | 0.0 | 0.1 | 0.1 | 0.1 | 0.1 |
| Light/med Naphtha | 71-100 | 0.0 | 0.1 | 0.1 | 0.1 | 0.1 |
| Med Naphtha | 100-166 | 0.0 | 1.5 | 1.5 | 1.5 | 1.4 |
| Naphtha/Kerosne | 166-193 | 0.1 | 1.0 | 1.0 | 1.0 | 1.1 |
| Kerosene | 193-232 | 1.0 | 2.6 | 2.6 | 2.6 | 2.7 |
| Diesel | 232-327 | 8.7 | 14.1 | 14.1 | 14.3 | 14.3 |
| Light VGO | 327-360 | 5.2 | 7.3 | 7.3 | 7.4 | 7.4 |
| Heavy VGO | 360-538 | 33.5 | 41.3 | 41.3 | 41.7 | 42.1 |
| Vacuum Resid. | >538 | 51.5 | 32.0 | 32.0 | 31.2 | 30.8 |

*g./cm3
**cSt

The slight variations in the values presented in the stability studies (Table 9 and other stability studies disclosed herein) are within the error of the test methods employed, and are acceptable within the art. These results demonstrate that the liquid products are stable.

These results indicate that over 50% of the components within the feedstock evolve at temperatures above 538° C. (vacuum resid fraction). This fraction is characterized by high molecular weight components with low volatility. Conversely, over several runs, the liquid product is characterized as comprising approx 68 to 74% of the product that are more volatile and evolve below 538° C. The feedstock can be further characterized with approx. 0.1% of its components evolving below 193° C. (naphtha/kerosene fraction), v. approx. 2.7 to 2.9% for the liquid product. The diesel fraction also demonstrates significant differences between the feedstock and liquid product with 8.7% (feedstock) and 14.1 to 15.8% (liquid product) evolving at this temperature range (232-327° C.). Collectively these results show that a substantial proportion of the components with low volatility in the feedstock have been converted to components of higher volatitly (light naphtha, kerosene and diesel) in the liquid product. These results demonstrate that the liquid product is substantially upgraded, and exhibits properties suitable for transport.

Example 3: Composite/Recycle of Feedstock

The pyrolysis reactor as described in U.S. Pat. No. 5,792,340 may be configured so that the recovery condensers direct the liquid products into the feed line to the reactor (see FIGS. 3 and 4).

The conditions of processing included a reactor temperature ranging from about 530° to about 590° C. Loading ratios for particulate heat carrier to feedstock for the initial and recycle run of about 30:1, and residence times from about 0.35 to about 0.7 sec were used. These conditions are outlined in more detail below (Table 10). Following pyrolysis of the feedstock, the lighter fraction was removed and collected using a hot condenser placed before the primary condenser (see FIG. 4), while the heavier fraction of the liquid product was recycled back to the reactor for further processing (also see FIG. 3). In this arrangement, the recycle stream (260) comprising heavy fractions was mixed with new feedstock (270) resulting in a composite feedstock (240) which was then processed using the same conditions as with the initial run within the pyrolysis reactor.

TABLE 10

Composite/Recycle operation using Saskatchewan Heavy Crude Oil and Undiluted Athabasca Bitumen

| Feedstock | Crack Temp ° C. | Yield Vol % | API° | Recycle4 Yield Vol % | Recycle4 API° |
|---|---|---|---|---|---|
| Heavy Oil | 590 | 77.[1] | 13.3 | 68.6 | 17.1 |
| | 560 | 86.3[2] | 16.2 | 78.1 | 21.1 |
| | 550 | 50.1[1] | 14.0 | 71.6 | 17.8 |

TABLE 10-continued

Composite/Recycle operation using Saskatchewan Heavy
Crude Oil and Undiluted Athabasca Bitumen

| Feedstock | Crack Temp ° C. | Yield Vol % | API° | Recycle4 Yield Vol % | Recycle4 API° |
|---|---|---|---|---|---|
|  | 550 | 65.1[2,3] | 18.3 | 56.4 | 22.9 |
|  | 530 | 87.1[2] | 16.6 | 78.9 | 21.0 |
| Bitumen | 590 | 75.2[2] | 12.4 | 67.0 | 16.0 |

[1]Yield and API gravity include overhead condensing (actual)
[2]Yield and API gravity include overhead condensing (estimated)
[3]Not all of the liquid was recovered in this
[4]These values represent the total recovery of product following the recycle run, and presume the removal of approximately 10% heavy fraction which is recycled to extinction. This is therefore a conservative estimate of yield as some of the heavy fraction will produce lighter components that enter the product stream, since not all of the heavy fraction will end up as coke.

The API gravity increased from 11.0 in the heavy oil feedstock to about 13 to about 18.5 after the first treatment cycle, and further increases to about 17 to about 23 after a second recycle treatment. A similar increase in API is observed for bitumen having a API of about 8.6 in the feedstock, which increase to about 12.4 after the first run and to 16 following the recycle run. With the increase in API, there is an associated increase in yield from about 77 to about 87% after the first run, to about 67 to about 79% following the recycle run. Therefore associated with the production of a lighter product, there is a decrease in liquid yield. However, an upgraded lighter product may be desired for transport, and recycling of liquid product achieves such a product.

Example 4: Two-Stage Treatment of Heavy Oil

Heavy oil or bitumen feedstock may also be processed using a two-stage pyrolytic process which comprises a first stage where the feedstock is exposed to conditions that mildly crack the hydrocarbon components in order to avoid overcracking and excess gas and coke production. Lighter materials are removed following the processing in the first stage, and the remaining heavier materials are subjected to a more severe crack at a higher temperature. The conditions of processing within the first stage include a reactor temperature ranging from about 510 to about 530° C. (data for 515° C. given below), while in the second stage, a temperature from about 590° to about 800° C. (data for 590° C. presented in table 11) was employed. The loading ratios for particulate heat carrier to feedstock range of about 30:1, and residence times from about 0.35 to about 0.7 sec for both stages. These conditions are outlined in more detail below (Table 11).

TABLE 11

Two-Stage Runs of Saskatchewan Heavy Oil

| Crack Temp. ° C. | Viscosity @ 80° C. (cSt) | Yield wt % | Density @ 15° C. g/ml | API° | Yield Vol % [1] |
|---|---|---|---|---|---|
| 515 | 5.3 | 29.8 | 0.943 | 18.6 | 31.4 |
| 590 | 52.6 | 78.9 | 0.990 | 11.4 | 78.1 |
| 515 & 590 | nd | nd | nd | 13.9 | 86.6 |

"nd" means not determined
[1] Light condensible materials were not captured. Therefore these values are conservative estimates.

These results indicate that a mild initial crack which avoids overcracking light materials to gas and coke, followed by a more severe crack of the heavier materials produces a liquid product characterized with an increased API, while still exhibiting good product yields.

Other runs using a two stage processes, involved injecting the feedstock at about 150° C. into a hot gas stream maintained at about 515° C. and entering the reactor at about 300° C. (processing temperature). The product, comprising lighter materials (low boilers) was separated and removed following the first stage in the condensing system. The heavier materials, separated out at the bottom of the cyclone were collected subjected to a more severe crack within the reactor in order to render a liquid product of reduced viscosity and high yield. The conditions utilized in the second stage were a processing temperature of between about 530° to about 590° C. Product from the second stage was processed and collected.

Following such a two stage process the product of the first stage (light boilers) is characterized with a yield of about 30 vol %, an API of about 19, and a several fold reduction in viscosity over the initial feedstock. The product of the high boiling point fraction, produced following the processing of the recycle fraction in the second stage, is typically characterized with a yield greater than about 75 vol %, and an API gravity of about 12, and a reduced viscosity over the feedstock recycled fraction.

Example 5: "Multi-Stage" Treatment of Heavy Oil and Bitumen, Using Feedstock for Quenching within Primary Condenser Heavy oil or bitumen feedstock may also be processed using a "Multi-stage" pyrolytic process as outlined in FIG. 5. In this system, the pyrolysis reactor described in U.S. Pat. No. 5,792,340 is configured so that the primary recovery condenser directs the liquid product into the feed line back to the reactor, and feedstock is introduced into the system at the primary condenser where it quenches the product vapours produced during pyrolysis.

The conditions of processing included a reactor temperature ranging from about 530° to about 590° C. Loading ratios for particulate heat carrier to feedstock for the initial and recycle run of from about 20:1 to about 30:1, and residence times from about 0.35 to about 1.2 sec were used. These conditions are outlined in more detail below (Table 12). Following pyrolysis of the feedstock, the lighter fraction is forwarded to the secondary condenser while the heavier fraction of the liquid product obtained from the primary condenser is recycled back to the reactor for further processing (FIG. 5).

TABLE 12

Charaterization of the liquid product obtained following Multi-Stage processing of Saskatchewan Heavy Oil and Bitumen

| Crack Temp. ° C. | Viscosity @ 40° C. (cSt) | Yield wt % | Density @ 15.6° C. g/ml | API° | Yield Vol % [1] |
|---|---|---|---|---|---|
| Heavy Oil |  |  |  |  |  |
| 543 | 80 | 62.6 | 0.9592 | 15.9 | 64.9 |
| 557 | 24 | 58.9 | 0.9446 | 18.2 | 62.1 |
| 561 | 53 | 70.9 | 0.9568 | 16.8 | 74.0 |
| Bitumen |  |  |  |  |  |
| 538 | 40 | 61.4 | 0.9718 | 14.0 | 71.1 |

The liquid products produced from multi-stage processing of feedstock exhibit properties suitable for transport with greatly reduced viscosity down from 6343 cSt (@40° C.) for heavy oil and 30380 cSt (@40° C.) for bitumen. Similarly, the API increased from 11 (heavy oil) to from 15.9 to 18.2, and from 8.6 (bitumen) to 14.7. Furthermore, yields for heavy oil under these reaction conditions are from 59 to 68% for heavy oil, and 82% for bitumen.

TABLE 13

Properties and SimDist of liquid products prepared from Heavy Oil using the multi- stage Process (for feedstock properties see Tables 1 and 5).

| Fraction | Temp (° C.) | R241*<br>Day 0 | R241*<br>Day 30 | R242<br>Day 30 | R244*<br>Day 30 |
|---|---|---|---|---|---|
| Density @ 15.6° C. | — | 0.9592 | 0.9597 | 0.9465 | 0.9591 |
| API | | 15.9 | 15.8 | 17.8 | 15.9 |
| Viscosity @ 40° C. | | 79.7 | 83.2 | 25.0 | 49.1 |
| Light Naphtha | <71 | 0.0 | 0.2 | 0.3 | 0.3 |
| Light/med Naphtha | 71-100 | 0.0 | 0.1 | 0.2 | 0.3 |
| Med Naphtha | 100-166 | 0.1 | 0.4 | 2.5 | 1.8 |
| Naphtha/Kerosne | 166-193 | 0.6 | 0.6 | 1.8 | 1.5 |
| Kerosene | 193-232 | 2.8 | 2.5 | 5.0 | 3.5 |
| Diesel | 232-327 | 21.8 | 21.0 | 23.1 | 18.9 |
| Light VGO | 327-360 | 10.8 | 10.2 | 9.9 | 8.8 |
| Heavy VGO | 360-538 | 51.1 | 45.0 | 44.9 | 43.2 |
| Vacuum Resid. | >538 | 12.7 | 20.0 | 12.3 | 21.7 |

*reactor temp. 543° C.
**reactor temp. 557° C.
***reactor temp. 561° C.

Under these run conditions the API increased from 11 to about 15.9 to 17.8. Product yields of 62.6 (wt %; R241), 58.9 (wt %; R242) and 70.9 (wt %; R244) were achieved along with greatly reduced viscosity levels. These liquid products have been substantially upgraded over the feedstock and exhibit properties suitable for pipeline transport.

SimDist results indicate that over 50% of the components within the feedstock evolve at temperatures above 538° C. (vacuum resid fraction), while the liquid product is characterized as comprising approx 78 to 87% of the product that are more volatile and evolve below 538° C. The feedstock can be further characterized with approx. 0.1% of its components evolving below 193° C. (naphtha/kerosene fraction), v. approx. 1.3 to 4.8% for the liquid product. The kerosene and diesel fractions also demonstrates significant differences between the feedstock and liquid product with 1% of the feedstock fraction evolving between 193-232° C. v. 2.8 to 5% for the liquid product, and with 8.7% (feedstock) and 18.9 to 23.1% (liquid product) evolving at this temperature range (232-327° C.; diesel). Collectively these results show that a substantial proportion of the components with low volatility in the feedstock have been converted to components of higher volatility (light naphtha, kerosene and diesel) in the liquid product. These results demonstrate that the liquid product is substantially upgraded, and exhibits properties suitable for transport.

TABLE 14

Properties and SimDist of liquid products prepared from Bitumen following "Two Stage" processing (reactor temp. 538° C.; for feedstock properties see Tables 1, 8 and 9).

| Fraction | Temp (° C.) | R243 |
|---|---|---|
| Density @ 15.6° C. | — | 0.9737 |
| API | | 13.7 |
| Viscosity @ 40° C. | | 45.4 |
| Light Naphtha | <71 | 0.3 |
| Light/med Naphtha | 71-100 | 0.4 |
| Med Naphtha | 100-166 | 3.6 |
| Naphtha/Kerosne | 166-193 | 1.9 |
| Kerosene | 193-232 | 4.4 |
| Diesel | 232-327 | 19.7 |
| Light VGO | 327-360 | 9.1 |
| Heavy VGO | 360-538 | 41.1 |
| Vacuum Resid. | >538 | 19.5 |

Under these run conditions the API increased from 8.6 to about 14. A product yield of 68.4 (wt %) was obtained along with greatly reduced viscosity levels (from 30380 cSt @40° C. in the feedstock, to approx. 45 cSt in the liquid product).

Simulated distillation analysis demonstrates that over 50% of the components within the feedstock evolve at temperatures above 538° C. (vacuum resid fraction) while 80.5% of the liquid product evolves below 538° C. The feedstock can be further characterized with approx. 0.1% of its components evolving below 193° C. (naphtha/kerosene fraction), v. 6.2% for the liquid product. The diesel fraction also demonstrates significant differences between the feedstock and liquid product with 8.7% (feedstock) and 19.7% (liquid product) evolving at this temperature range (232-327° C.). Collectively these results show that a substantial proportion of the components with low volatility in the feedstock have been converted to components of higher volatily (light naphtha, kerosene and diesel) in the liquid product. These results demonstrate that the liquid product is substantially upgraded, and exhibits properties suitable for transport.

Figure 6:
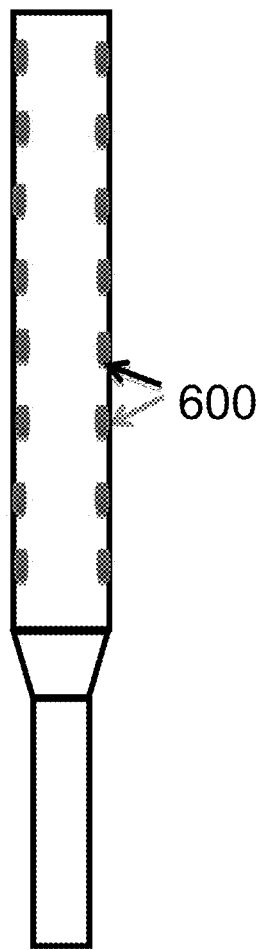
FIG. 6 is an exemplary embodiment of an implementation of speed bumps in the reactor in accordance with the present disclosure.

Inside the Reactor, homogenous mixing of the sand and hydrocarbon is required for optimal selectivity and yield. Backmixing and non-ideal mixing occurs as the hydrocarbon migrates towards the center and the sand migrates to the outer flow regimes. The installation of speed bumps 600 (FIG. 6) distributed up the Reactor promotes better mixing and improved selectivity and promotes a homogenous mixture of sand and hydrocarbon. In an exemplary embodiment, the speed bumps 600 would be spaced approximately every 6'-0" of elevation of the reactor. However, the spacing of the speed bumps 600 can be varied as desired. The size of the speed bumps 600 would be dependent on the diameter of the reactor. In a preferred embodiment, the decrease in diameter would be equivalent to an 8-10% decrease in reactor area for each bump ring. However, the decrease in diameter could vary from 1%-30% in other embodiments. The shapes are preferably rounded, or semi-circular, similar to a speed bump. In one exemplary embodiment, the speed bumps 600 would have a height to length ratio of 0.5, i.e. if the bumps were 2 inches in height, they would be 4 inches in total taper up and back down. In one embodiment, the speed bumps 600 are formed by using a ring that has tapered refractory installed over it. The size, spacing, dimensions, and method of formation of the speed bumps 600 provided herein is provided as an example only and should not be limiting to the scope of the invention disclosed.

In upgrading heavy oil, optimum selectivity and liquid yield are the most economical objectives. In the HTL Reactor, the vacuum residue feed is subjected to very high temperature for a short period of time. The high molecular weight hydrocarbons are partially converted to lighter hydrocarbons and a gaseous reactor effluent sent to the Product Fractionation unit. A hot circulating sand stream acts as the heat source in the HTL Reactor. Hot sand is supplied to the base of the reactor and is transported up the reactor by a circulating recycle gas stream. The vacuum residue feed is injected into the upflowing sand and forms a thin coating on the surface of the sand particles. As the sand heats the injected hydrocarbons, lighter gaseous hydrocarbons are produced leaving a layer of coke on the surface of the sand particles. At the reactor outlet, the Reactor Cyclone separates the sand from the gaseous reactor effluent.

Inside the Reactor, an optimum sand density is desired to vaporize the vacuum residue feed with the highest sand density located at the hydrocarbon feed nozzle. The optimum sand density is obtained by varying the HTL Reactor area. The highest sand density at the feed nozzle has the larger HTL Reactor area while the smaller area is up the riser at the Reactor outlet.

Figure 7:
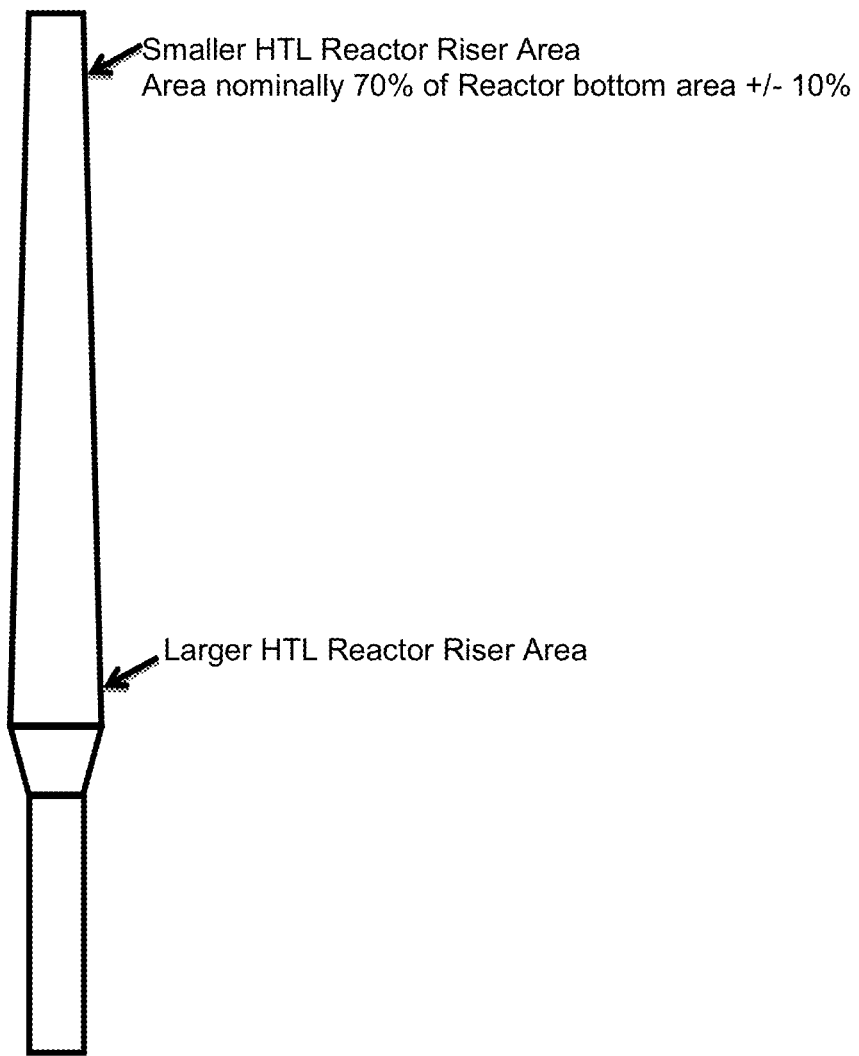
FIG. 7 is a schematic of a reactor used in conjunction with the present disclosure.

The HTL Reactor area is larger at the hydrocarbon feed nozzle to produce the highest sand density. The Reactor area will be smaller up the riser. This is dependent on the feed rate and sand-to-oil ratio, but the nominal value would be the top Reactor outlet area would be 70% of the bottom, plus or minus 10%. An exemplary Reactor is depicted in FIG. 7.

Reactor geometry can affect the fluidized sand density in a particular part of the riser. The higher the sand density the more sand there is in a specific volume at as specific time. As shown in FIGS. 8-11 of results from sample test runs, higher and lower sand density at the feed injection site may impact the HTL product properties. Other configuration of the riser can alternate low and high density sand sections to improve mixing. The lower sand density feed zone gives a higher liquid yield, higher coke, and lower gas yields. 1000F+ conversion increased using the lower density sand feed zone. In a further embodiment, the tapering of the reactor diameter may be combined with the addition of speed bumps.

All citations are herein incorporated by reference.

The present disclosure has been described with regard to preferred embodiments. However, it will be obvious to persons skilled in the art that a number of variations and modifications can be made without departing from the scope of the disclosure as described herein.

What is claimed is:

1. A fast pyrolysis apparatus for upgrading a heavy hydrocarbon feedstock, said apparatus comprising:
   a feed system;
   an upflow pyrolysis reactor comprising an upstream feed injection zone and a downstream conversion zone, wherein the conversion zone is continuously tapered such that the diameter at the top of the conversion zone is 60 to 80% of the diameter at the bottom of the conversion zone;
   a particulate heat carrier separation system;
   a particulate heat carrier reheating system; and
   a product collecting system.

2. The apparatus of claim 1, wherein the reactor further comprises a plurality of raised bumps along the interior wall of the reactor in a mixing zone located above a feedstock injection nozzle.

3. The apparatus of claim 2, wherein each raised bump is formed by a circumferential ring on an interior wall of the reactor.

4. The apparatus of claim 2, wherein the raised bumps are disposed every 4 to 8 feet of elevation of the reactor.

5. The apparatus of claim 4, wherein the raised bumps are disposed approximately every 6 feet of elevation of the reactor.

6. The apparatus of claim 2, wherein the raised bumps decrease the reactor diameter by 8 to 10 percent.

7. The apparatus of claim 2, wherein the raised bumps are semi-circular in shape.

* * * * *